US012676742B2

(12) United States Patent
Bordow et al.

(10) Patent No.: US 12,676,742 B2
(45) Date of Patent: Jul. 7, 2026

(54) KEY ESTABLISHMENT AND SECURE COMMUNICATIONS BASED ON SATELLITE-CONNECTED ENTROPY SOURCES

(71) Applicant: Wells Fargo Bank, N.A., San Francisco, CA (US)

(72) Inventors: Peter Burton Bordow, Fountain Hills, AZ (US); David Marc Delfiner, Charlotte, NC (US); Michael Erik Meinholz, Charlotte, NC (US); Abhijit Rao, Irvine, CA (US); Bradford A. Shea, Mint Hill, NC (US); Jeff J. Stapleton, O'Fallon, MO (US); Richard Toohey, Burlington, VT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 127 days.

(21) Appl. No.: 18/584,096

(22) Filed: Feb. 22, 2024

(65) Prior Publication Data

US 2025/0274276 A1 Aug. 28, 2025

(51) Int. Cl.
H04L 9/08 (2006.01)
H04L 9/40 (2022.01)

(52) U.S. Cl.
CPC .......... H04L 9/0869 (2013.01); H04L 9/0852 (2013.01); H04L 63/0435 (2013.01)

(58) Field of Classification Search
CPC ... H04L 9/0822; H04L 9/0852; H04L 9/0869; H04L 9/14; H04L 63/0435
See application file for complete search history.

(56) References Cited

U.S. PATENT DOCUMENTS 5,966,224 A 10/1999 Hughes et al.
6,487,294 B1 11/2002 Alexander
(Continued)

FOREIGN PATENT DOCUMENTS

AU 2020381167 6/2022
CN 102857911 1/2013
(Continued)

OTHER PUBLICATIONS

Bedington, Robert, "Progress in satellite quantum key distribution", npj Quantum Information (2017) 3:30 ; doi:10.1038 s41534-017-0031-5https: www.nature.com articles s41534-017-0031-5, (Aug. 9, 2017), 13 pgs.
(Continued)

*Primary Examiner* — Sharon S Lynch
(74) *Attorney, Agent, or Firm* — SCHWEGMAN LUNDBERG & WOESSNER, P.A.

(57) ABSTRACT

Systems and techniques for secure communications and distribution of random values, provided via satellite communications, are described. These random values are generated from one or more ground-based entropy sources (e.g., quantum random number generators (QRNGs) at terrestrial locations), and optionally combined with values from satellite-based entropy sources (e.g., QRNGs at non-terrestrial locations). An example method includes: receiving a first random value generated by a first QRNG at a terrestrial location; receiving a second random value and a third random value via at least one satellite communication, each additional random value generated by other QRNGs; and generating a cryptographic key based on the first random value, the second random value, and the third random value. The cryptographic key may be produced by a key derivation function that combines the random values, and the crypto-
(Continued)

graphic key may be used to establish a secure communication session.

14 Claims, 17 Drawing Sheets

(56) References Cited

U.S. PATENT DOCUMENTS

| | | | |
|---|---|---|---|
| 8,015,224 | B1 | 9/2011 | Chaichanavong et al. |
| 8,374,505 | B2 | 2/2013 | Toyoshima et al. |
| 9,465,582 | B1 | 10/2016 | Whelan et al. |
| 9,548,862 | B1 | 1/2017 | Potter |
| 10,540,146 | B1 | 1/2020 | Vakili |
| 10,552,120 | B1 | 2/2020 | Vakili |
| 10,728,029 | B1 | 7/2020 | Vakili |
| 11,218,471 | B1 | 1/2022 | Stapleton et al. |
| 11,356,247 | B1 | 6/2022 | Carter, Jr. et al. |
| 11,640,002 | B2 | 5/2023 | Reid et al. |
| 12,362,913 | B2* | 7/2025 | D'Souza ............... H04L 9/0852 |
| 2004/0109567 | A1 | 6/2004 | Yang et al. |
| 2004/0141614 | A1 | 7/2004 | Choi et al. |
| 2005/0216419 | A1 | 9/2005 | Lee et al. |
| 2008/0046757 | A1 | 2/2008 | Staddon et al. |
| 2013/0003968 | A1 | 1/2013 | Kang et al. |
| 2013/0083926 | A1* | 4/2013 | Hughes ................ H04L 9/3247 |
| | | | 380/278 |
| 2015/0052360 | A1 | 2/2015 | Ravishankar et al. |
| 2015/0134947 | A1 | 5/2015 | Varcoe et al. |
| 2018/0343055 | A1 | 11/2018 | Olson |
| 2020/0014460 | A1 | 1/2020 | Tong et al. |
| 2020/0169572 | A1 | 5/2020 | Jana et al. |
| 2020/0252436 | A1 | 8/2020 | Yoon et al. |
| 2020/0328886 | A1 | 10/2020 | Newton et al. |
| 2021/0176071 | A1 | 6/2021 | Maass et al. |
| 2021/0203495 | A1 | 7/2021 | Daniel et al. |
| 2022/0094431 | A1 | 3/2022 | Kaen et al. |
| 2022/0329420 | A1 | 10/2022 | Paik et al. |
| 2022/0368543 | A1 | 11/2022 | Hori |
| 2022/0407688 | A1 | 12/2022 | Childe et al. |
| 2023/0171003 | A1 | 6/2023 | Paudel et al. |
| 2023/0177339 | A1 | 6/2023 | Lord |
| 2023/0291555 | A1 | 9/2023 | Berta et al. |
| 2024/0106641 | A1* | 3/2024 | Yeomans ................ H04L 9/088 |
| 2024/0129116 | A1* | 4/2024 | Yeomans .............. H04L 9/0852 |
| 2024/0178994 | A1* | 5/2024 | Bedington ............ H04L 9/0869 |
| 2024/0281537 | A1 | 8/2024 | Gupta et al. |
| 2024/0313949 | A1* | 9/2024 | Yeomans .............. H04L 9/0855 |
| 2024/0340160 | A1* | 10/2024 | D'Souza ............... H04L 9/0631 |
| 2024/0388430 | A1* | 11/2024 | Tranier ................ H04L 9/0869 |
| 2025/0274270 | A1 | 8/2025 | Bordow et al. |
| 2025/0274277 | A1 | 8/2025 | Bordow et al. |

FOREIGN PATENT DOCUMENTS

| | | |
|---|---|---|
| CN | 106878015 | 6/2017 |
| CN | 107147489 | 10/2019 |
| CN | 111385032 | 4/2021 |
| CN | 112929104 | 9/2021 |
| CN | 214281394 | 9/2021 |
| CN | 113098686 | 1/2022 |
| CN | 115334497 | 11/2022 |
| CN | 116015410 | 4/2023 |
| CN | 111385088 | 5/2023 |
| EP | 4125239 | 2/2023 |
| KR | 20070016398 | 2/2007 |
| WO | 2022211731 | 10/2022 |
| WO | 2022243657 | 11/2022 |
| WO | 2023082599 | 5/2023 |
| WO | 2023096586 | 6/2023 |

OTHER PUBLICATIONS

Cao, Xiaoli, "Dynamic Routings in Satellite Networks: An Overview", Sensors 2022, 22, 4552. https: doi.org 10.3390 s22124552, (Jun. 16, 2022), 46 pgs.

Del Portillo, Inigo, "Ground Segment Architectures for Large Leoconstellations With Feeder Links in EHF-Bands", IEEE Aerospace Conference 2018 Big Sky, Montanahttps: www.inigodelportillo. com files Location-GS-EHF-IEEE-2018-slides.pdf, (Mar. 7, 2018), 22 pgs.

Grillo, Milo, "Resource allocation in a Quantum Key Distribution Network with LEO and GEO trusted-repeaters", 2021 17th International Symposium on Wireless Communication Systems (ISWCS), Sep. 2021, Berlin, Germany. pp. 1-6,10.1109 ISWCS49558.2021. 9562139, (Nov. 27, 2021), 7 pgs.

Hao, Yinou, "Key Generation Method Based on Multi-Satellite Cooperation and Random Perturbation", Entropy 2021, 23(12), 1653; https: doi.org 10.3390 e23121653, (Dec. 8, 2021), 20 pgs.

Kasliwal, Keshav, "Enhancing satellite-to-ground communication using quantum key distribution", IET Quant. Comm. 2023;4:57-69., (Feb. 11, 2023), 14 pgs.

Khmelev, Aleksandr V., "Semi-Empirical Satellite-to-Ground Quantum Key Distribution Model for Realistic Receivers", Entropy 2023, 25,670. https: doi.org 10.3390 e25040670, (Apr. 17, 2023), 15 pgs.

Liao, Sheng-Kai, "Satellite-relayed intercontinental quantum network", Phys. Rev. Lett. 120, 030501, (Jan. 19, 2018), 10 pgs.

Reezwana, Ayesha, "A quantum random number generator on a nanosatellite in low Earth orbit", Communications Physics | (2022) 5:314 | https: doi.org 10.1038 s42005-022-01096-7 | www.nature. com commsphy, (2022), 6 pgs.

Salmasi, Allen, "An Overview of the OmniTRACS—The First Operational Two-Way Mobile Ku-Band Satellite Communications System", Proceedings of the 2nd International Technical Meeting of the Satellite Division of The Instituteof Navigation (ION GPS 1989)Sep. 27-29, 1989pp. 127-131, (Sep. 1989), 3 pgs.

Wang, Junyong, "Networking Feasibility of Quantum Key Distribution Constellation Networks", Entropy 2022, 24, 298, (2022), 23 pgs.

Yue, Pingyue, "Low Earth Orbit Satellite Security and Reliability: Issues, Solutions, and the Road Ahead", arXiv:2201.03063https: arxiv.org pdf 2201.03063v2, (May 15, 2023), 49 pgs.

Zhang, Senbai, "A Multi-objective Satellite Handover Strategy Based on Entropy in LEO Satellite Communications", 2020 IEEE 6th International Conference on Computer and Communications (ICCC), (Dec. 11, 2020), 6 pgs.

Zhang, Yufeng, "Deep Neural Network-Based Receiver for NextGeneration LEO Satellite Communications", in IEEE Access, vol. 8, pp. 222109-222116, 2020, doi: 10.1109 ACCESS.2020.3044321., (Nov. 21, 2020), 8 pgs.

U.S. Appl. No. 18/584,101, filed Feb. 22, 2024, Key Establishment and Secure Communications Based on Satellite Entropy Sources.

U.S. Appl. No. 18/584,111, filed Feb. 22, 2024, Key Establishment and Secure Communications Using Satellite-Provided Random Number Values.

"U.S. Appl. No. 18/584,111, Non Final Office Action mailed Jul. 9, 2025", 8 pgs.

"U.S. Appl. No. 18/584,111, Response filed Aug. 13, 2025 to Non Final Office Action mailed Jul. 9, 2025", 7 pgs.

"U.S. Appl. No. 18/584,111, Notice of Allowance mailed Sep. 3, 2025", 6 pgs.

"U.S. Appl. No. 18/584,111, Non Final Office Action mailed Sep. 16, 2025", 12 pgs.

"U.S. Appl. No. 18/584,111, Corrected Notice of Allowability mailed Sep. 23, 2025", 2 pgs.

* cited by examiner

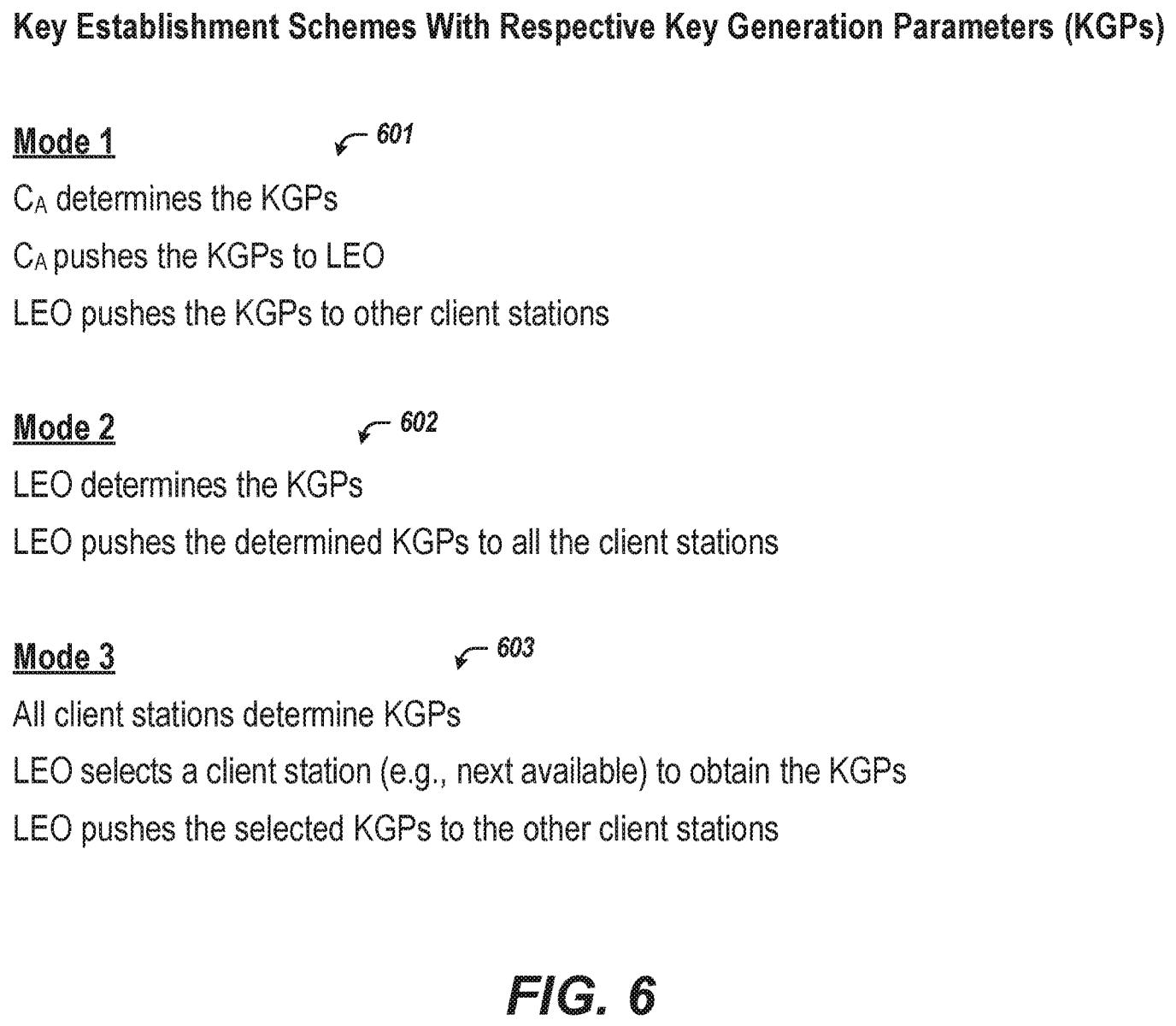

Key Establishment Schemes With Respective Key Generation Parameters (KGPs)

Mode 1          ⟋ 601

$C_A$ determines the KGPs $C_A$ pushes the KGPs to LEO

LEO pushes the KGPs to other client stations

Mode 2          ⟋ 602

LEO determines the KGPs

LEO pushes the determined KGPs to all the client stations

Mode 3          ⟋ 603

All client stations determine KGPs

LEO selects a client station (e.g., next available) to obtain the KGPs

LEO pushes the selected KGPs to the other client stations

*FIG. 6*

Ground Operations: Terrestrial-Based Entropy Generation

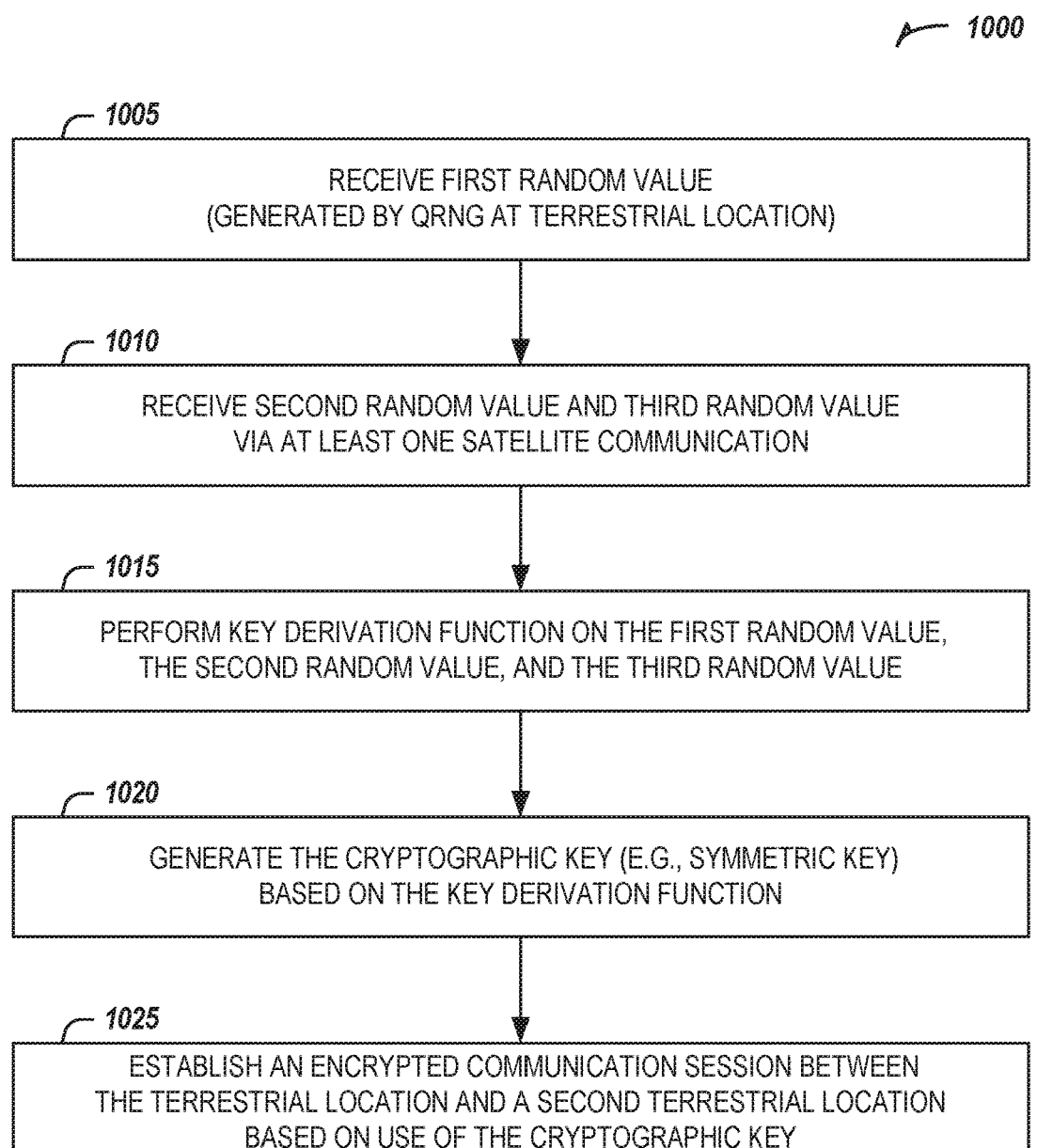

1000

1005

RECEIVE FIRST RANDOM VALUE
(GENERATED BY QRNG AT TERRESTRIAL LOCATION)

1010

RECEIVE SECOND RANDOM VALUE AND THIRD RANDOM VALUE
VIA AT LEAST ONE SATELLITE COMMUNICATION

1015

PERFORM KEY DERIVATION FUNCTION ON THE FIRST RANDOM VALUE,
THE SECOND RANDOM VALUE, AND THE THIRD RANDOM VALUE

1020

GENERATE THE CRYPTOGRAPHIC KEY (E.G., SYMMETRIC KEY)
BASED ON THE KEY DERIVATION FUNCTION

1025

ESTABLISH AN ENCRYPTED COMMUNICATION SESSION BETWEEN
THE TERRESTRIAL LOCATION AND A SECOND TERRESTRIAL LOCATION
BASED ON USE OF THE CRYPTOGRAPHIC KEY

*FIG. 10*

Satellite Operations: Terrestrial-Based Entropy Generation

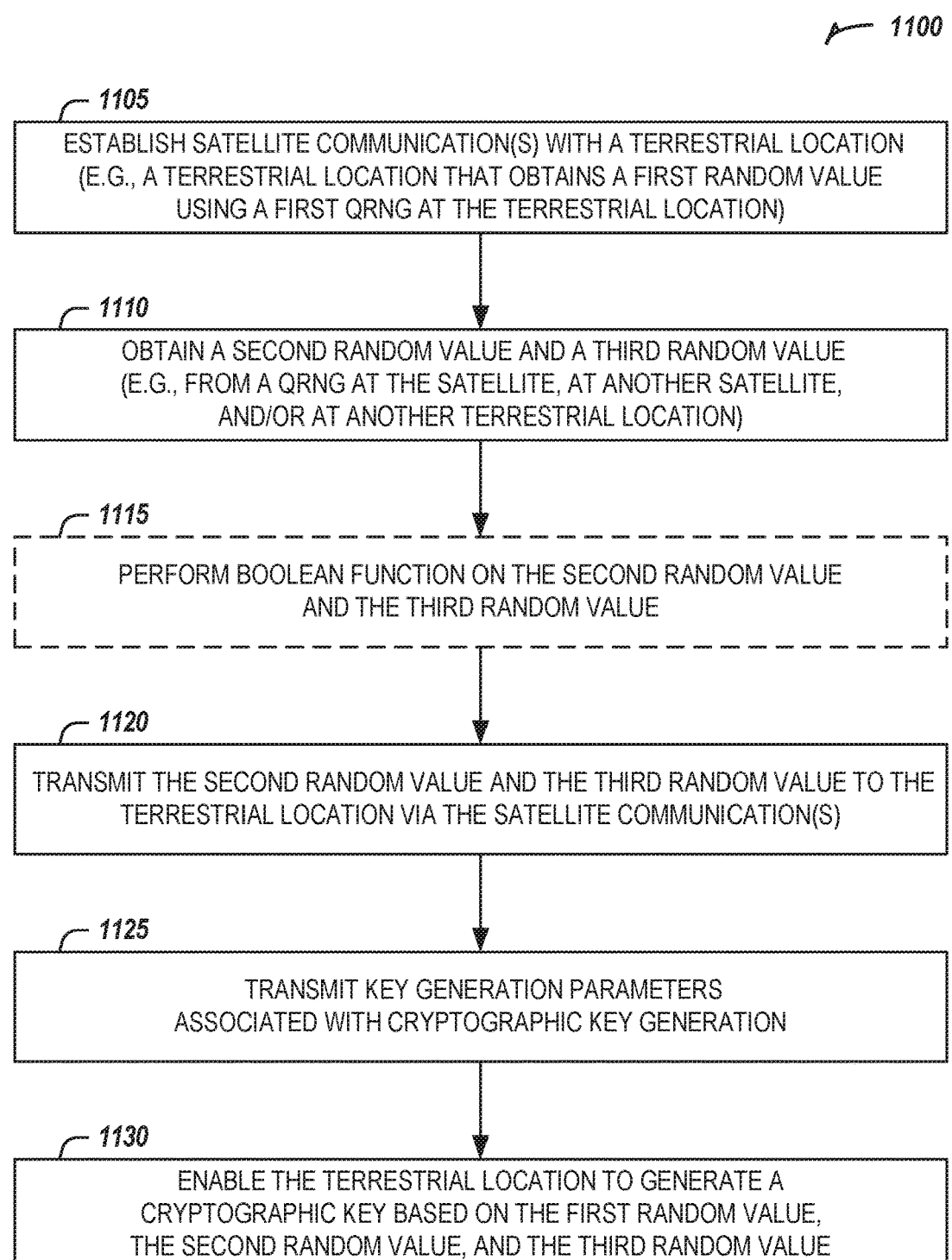

*1100*

*1105*

ESTABLISH SATELLITE COMMUNICATION(S) WITH A TERRESTRIAL LOCATION
(E.G., A TERRESTRIAL LOCATION THAT OBTAINS A FIRST RANDOM VALUE
USING A FIRST QRNG AT THE TERRESTRIAL LOCATION)

*1110*

OBTAIN A SECOND RANDOM VALUE AND A THIRD RANDOM VALUE
(E.G., FROM A QRNG AT THE SATELLITE, AT ANOTHER SATELLITE,
AND/OR AT ANOTHER TERRESTRIAL LOCATION)

*1115*

PERFORM BOOLEAN FUNCTION ON THE SECOND RANDOM VALUE
AND THE THIRD RANDOM VALUE

*1120*

TRANSMIT THE SECOND RANDOM VALUE AND THE THIRD RANDOM VALUE TO THE
TERRESTRIAL LOCATION VIA THE SATELLITE COMMUNICATION(S)

*1125*

TRANSMIT KEY GENERATION PARAMETERS
ASSOCIATED WITH CRYPTOGRAPHIC KEY GENERATION

*1130*

ENABLE THE TERRESTRIAL LOCATION TO GENERATE A
CRYPTOGRAPHIC KEY BASED ON THE FIRST RANDOM VALUE,
THE SECOND RANDOM VALUE, AND THE THIRD RANDOM VALUE

*FIG. 11*

Ground Operations: Satellite-Based Entropy Generation

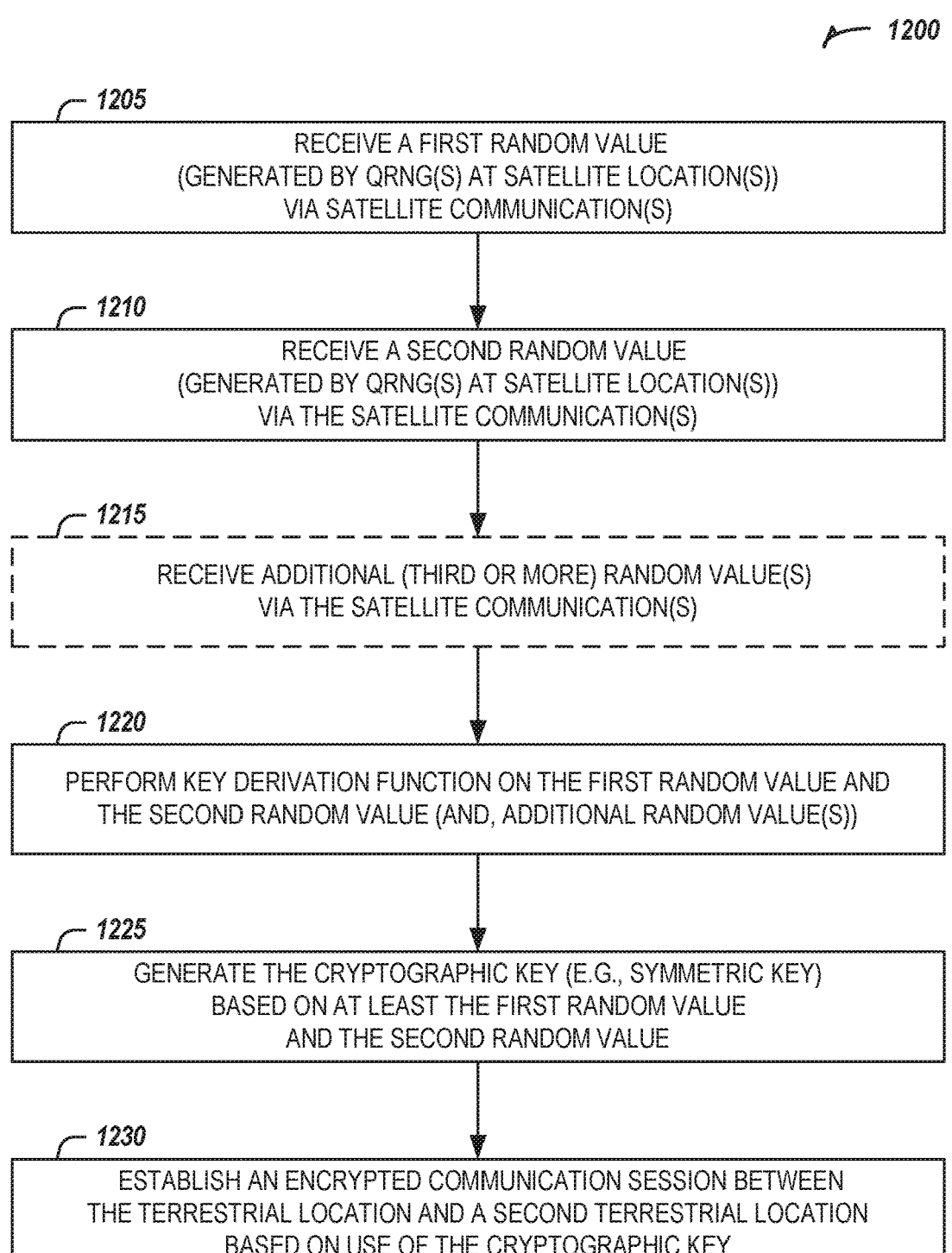

*1200*

1205

RECEIVE A FIRST RANDOM VALUE
(GENERATED BY QRNG(S) AT SATELLITE LOCATION(S))
VIA SATELLITE COMMUNICATION(S)

1210

RECEIVE A SECOND RANDOM VALUE
(GENERATED BY QRNG(S) AT SATELLITE LOCATION(S))
VIA THE SATELLITE COMMUNICATION(S)

1215

RECEIVE ADDITIONAL (THIRD OR MORE) RANDOM VALUE(S)
VIA THE SATELLITE COMMUNICATION(S)

1220

PERFORM KEY DERIVATION FUNCTION ON THE FIRST RANDOM VALUE AND
THE SECOND RANDOM VALUE (AND, ADDITIONAL RANDOM VALUE(S))

1225

GENERATE THE CRYPTOGRAPHIC KEY (E.G., SYMMETRIC KEY)
BASED ON AT LEAST THE FIRST RANDOM VALUE
AND THE SECOND RANDOM VALUE

1230

ESTABLISH AN ENCRYPTED COMMUNICATION SESSION BETWEEN
THE TERRESTRIAL LOCATION AND A SECOND TERRESTRIAL LOCATION
BASED ON USE OF THE CRYPTOGRAPHIC KEY

*FIG. 12*

Satellite Operations: Satellite-Based Entropy Generation

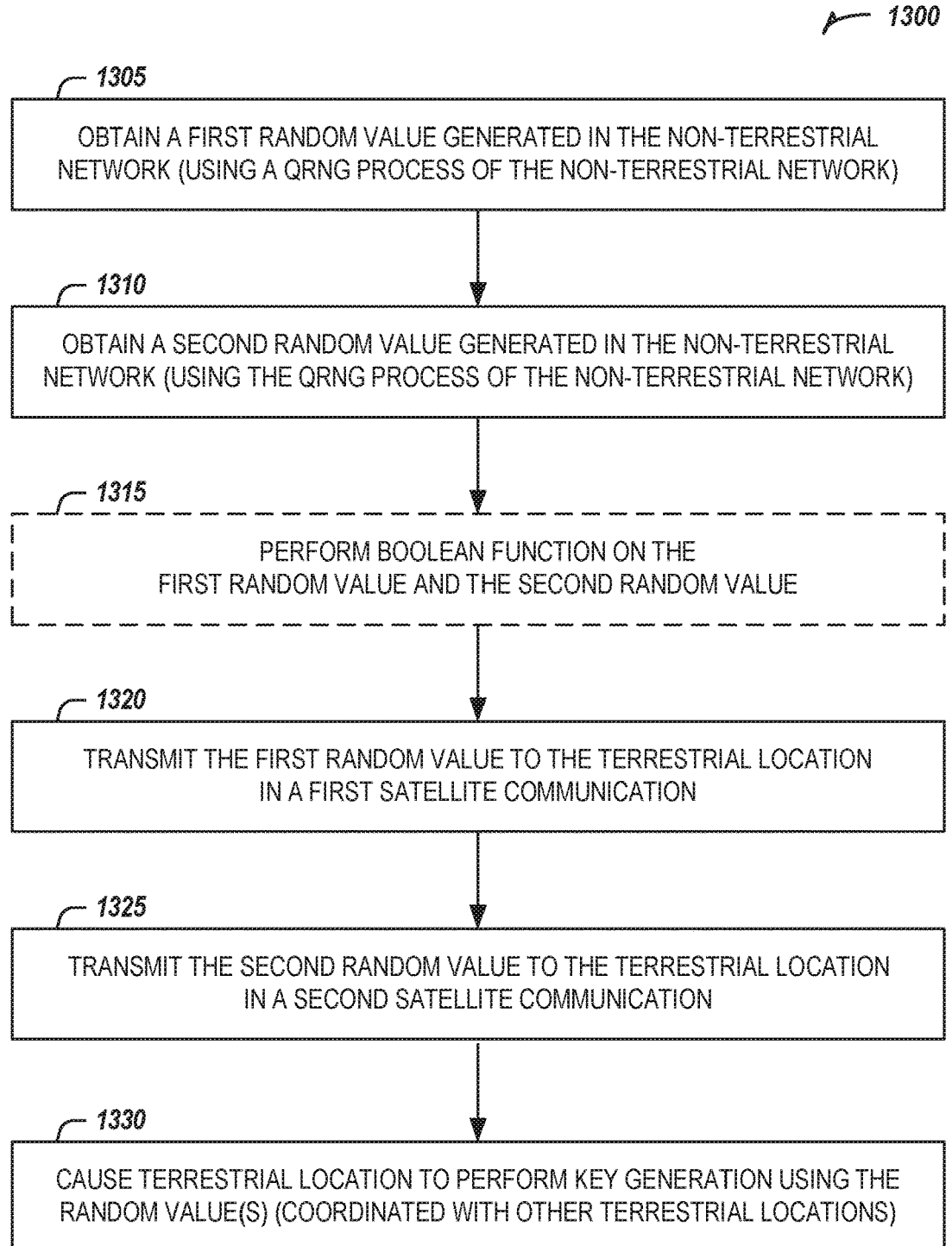

*1300*

*1305*

OBTAIN A FIRST RANDOM VALUE GENERATED IN THE NON-TERRESTRIAL NETWORK (USING A QRNG PROCESS OF THE NON-TERRESTRIAL NETWORK)

*1310*

OBTAIN A SECOND RANDOM VALUE GENERATED IN THE NON-TERRESTRIAL NETWORK (USING THE QRNG PROCESS OF THE NON-TERRESTRIAL NETWORK)

*1315*

PERFORM BOOLEAN FUNCTION ON THE FIRST RANDOM VALUE AND THE SECOND RANDOM VALUE

*1320*

TRANSMIT THE FIRST RANDOM VALUE TO THE TERRESTRIAL LOCATION IN A FIRST SATELLITE COMMUNICATION

*1325*

TRANSMIT THE SECOND RANDOM VALUE TO THE TERRESTRIAL LOCATION IN A SECOND SATELLITE COMMUNICATION

*1330*

CAUSE TERRESTRIAL LOCATION TO PERFORM KEY GENERATION USING THE RANDOM VALUE(S) (COORDINATED WITH OTHER TERRESTRIAL LOCATIONS)

*FIG. 13*

Ground Operations: Key Generation With Key Generation Parameters

Satellite Operations: Key Generation With Key Generation Parameters

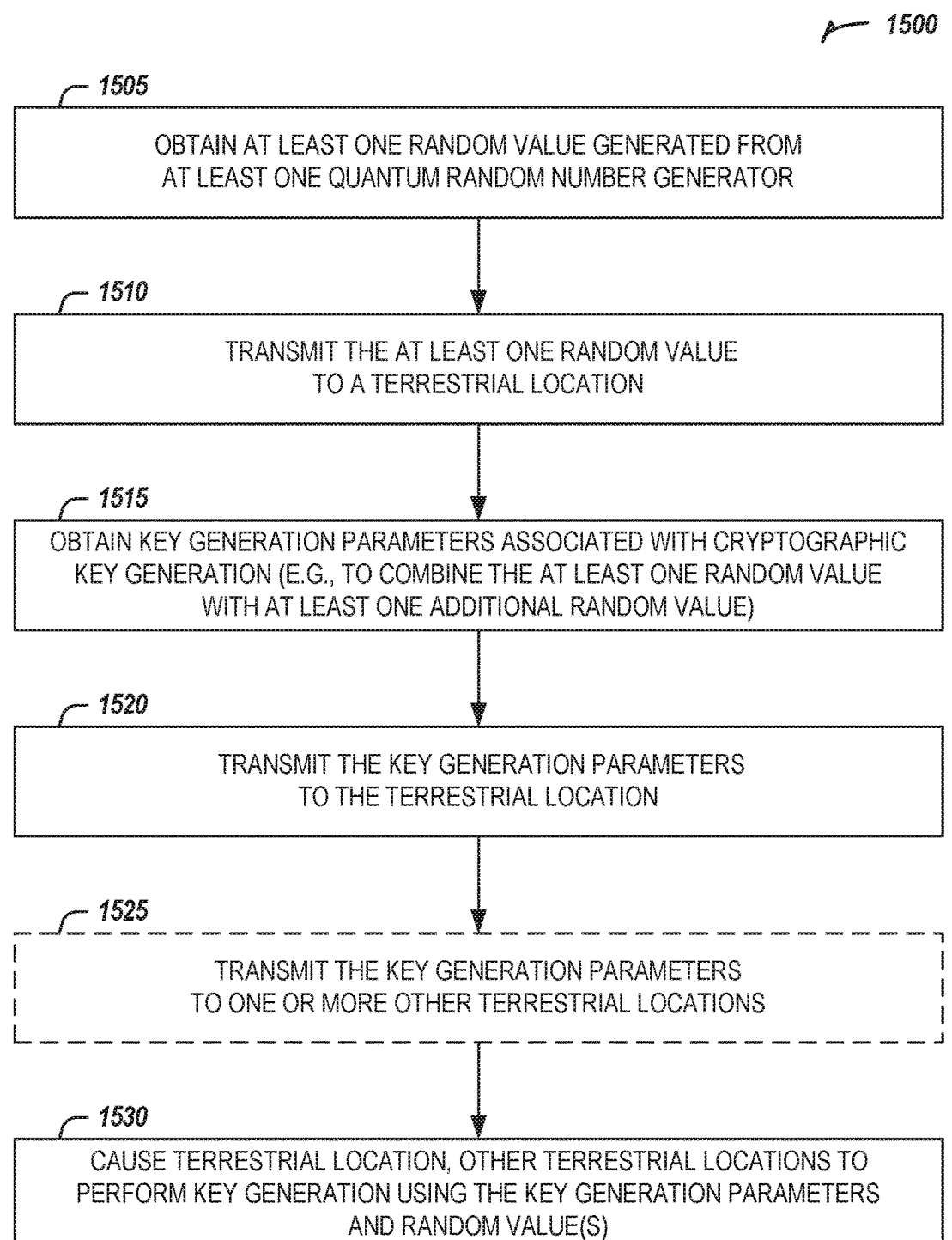

1500

1505
OBTAIN AT LEAST ONE RANDOM VALUE GENERATED FROM
AT LEAST ONE QUANTUM RANDOM NUMBER GENERATOR

1510
TRANSMIT THE AT LEAST ONE RANDOM VALUE
TO A TERRESTRIAL LOCATION

1515
OBTAIN KEY GENERATION PARAMETERS ASSOCIATED WITH CRYPTOGRAPHIC
KEY GENERATION (E.G., TO COMBINE THE AT LEAST ONE RANDOM VALUE
WITH AT LEAST ONE ADDITIONAL RANDOM VALUE)

1520
TRANSMIT THE KEY GENERATION PARAMETERS
TO THE TERRESTRIAL LOCATION

1525
TRANSMIT THE KEY GENERATION PARAMETERS
TO ONE OR MORE OTHER TERRESTRIAL LOCATIONS

1530
CAUSE TERRESTRIAL LOCATION, OTHER TERRESTRIAL LOCATIONS TO
PERFORM KEY GENERATION USING THE KEY GENERATION PARAMETERS
AND RANDOM VALUE(S)

*FIG. 15*

KEY ESTABLISHMENT AND SECURE COMMUNICATIONS BASED ON SATELLITE-CONNECTED ENTROPY SOURCES

TECHNICAL FIELD

Embodiments described herein generally relate to cryptographic key establishment and techniques, secure communication sessions established with the use of cryptographic keys, and related encrypted communications provided among satellite (non-terrestrial) and Earth-based (terrestrial) networks.

BACKGROUND

A variety of techniques have been identified as a source of entropy for random number generators. Entropy in this context refers to a measure of the amount of randomness in a system, specifically in the form of a random input that is collected and provided as a seed to an algorithm that generates a cryptographic key (e.g., an algorithm that generates a symmetric key). Some techniques have captured variable inputs as a source of entropy for random number generators, such as variable input from a user's keyboard timing or mouse movement, physical measurements from sensors that measure electric or electronic noise, and other types of measurements of unpredictable events. However, despite the variation in such input, the use of these inputs as a seed to a random number generator has been shown to produce output that is deterministic and predictable (and thus, will not be truly random). As a result, the underlying cryptographic keys that are produced with such random number generators can be compromised in some scenarios.

Improvements to random number generators have been researched and developed. Some of the most sophisticated methods of random number generators being developed involve the use of quantum random number generators (QRNGs). QRNGs are understood to produce fully random values, in theory, due to the intrinsic randomness at the core of quantum mechanics.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates multiple approaches for the use of key generation parameters.

FIG. 10 illustrates a flowchart of an example method performed by a computing system operating at a terrestrial location for generating a cryptographic key based on satellite-provided random values.

FIG. 11 illustrates a flowchart of an example method performed by a computing system operating at a satellite (non-terrestrial) location for communicating random values used in cryptographic key generation.

FIG. 12 illustrates a flowchart of an example method performed by a computing system operating at a terrestrial location for generating a cryptographic key based on multiple satellite-generated random values.

FIG. 13 illustrates a flowchart of a method performed by a computing system operating at a satellite (non-terrestrial) location for providing entropy used in cryptographic key generation, based on multiple satellite-generated random values.

FIG. 15 illustrates a flowchart of a method performed by a computing system operating at a satellite (non-terrestrial) location to enable cryptographic operations based on a key generation scheme.

DETAILED DESCRIPTION

Figure 1:
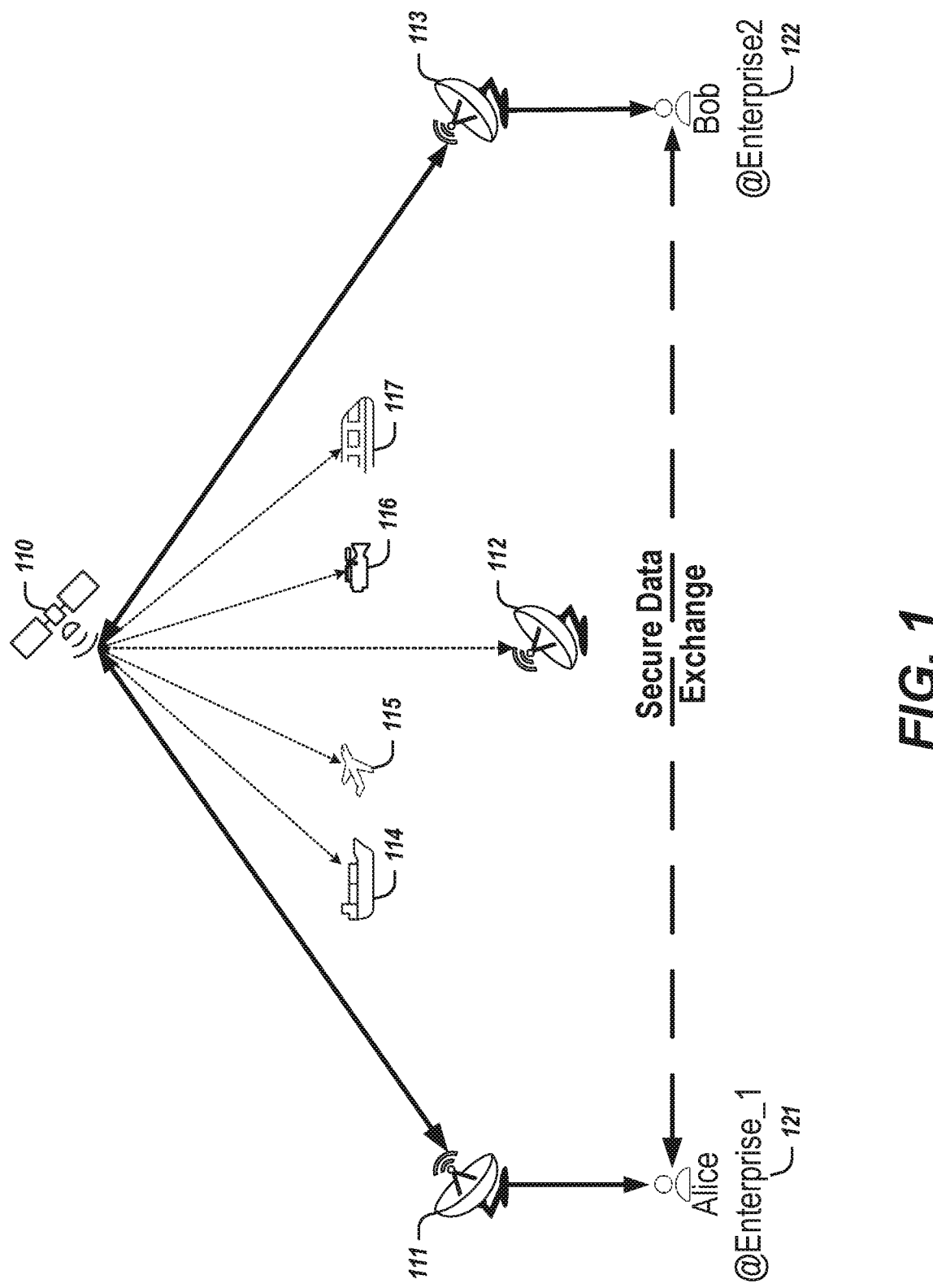
FIG. 1 illustrates an example communication environment among entities using terrestrial and non-terrestrial systems.

The systems and techniques discussed herein discuss approaches for the generation, communication, and use of random values from quantum random number generators (QRNGs) based on quantum-derived entropy, including values exchanged via satellite networking transmissions to separate geographic locations. The resulting cryptographic keys are thus better due to an improved high-quality source of entropy. Also, the resulting approaches for generating cryptographic keys are more secure due to the geographic and physical separation provided between potential rogue actors and a satellite network, and the related difficulty in compromising, intercepting, or interfering with Earth-to-satellite, satellite-to-Earth, and/or satellite-to-satellite transmissions.

The techniques discussed herein specifically refer to examples involving the use of a low-Earth orbit (LEO) satellite or satellites to generate cryptographic keys by exchanging random values among multiple entities. A LEO satellite typically refers to a satellite orbiting between 500 to 2,000 kilometers above Earth, including in groups of satellites known as a satellite constellation. However, other types of satellite networks and satellite network communications may be used in some scenarios, including in redundant or failover operations. Other types of satellite networks may involve geosynchronous orbit satellite networks (e.g., orbiting at approximately 35,786 kilometers but synchronized with the rotation of the earth), medium-Earth orbit satellite networks (e.g., orbiting between 2,000 to 36,000 kilometers above Earth) or high-Earth orbit satellite networks (e.g., orbiting more than 36,000 kilometers above earth). The term "non-terrestrial" or "satellite" is generally used in this document to refer to a space location or entity, whereas the term "terrestrial" or "ground" is generally used in this document to refer to an Earth location or entity. Terrestrial locations may include fixed or mobile stations, computing units of different form factors such as servers and virtual machines, including but not limited to mobile locations provided by planes, trains, ships that are moveable among different geographic sectors and coverage areas.

The following discusses approaches for use of ground-based sources of entropy, such as from two or more ground stations that obtain random values from independent QRNGs. Satellite communications are used to exchange these random values among the ground stations, and the satellites may potentially perform operations on the random values before distributing the random values (or a derivative of the random values) among the ground stations. The operations performed on the random values may be based on particular key generation parameters and key generation schemes that are selected and/or changed to introduce further variability and increase security.

The following also discusses other approaches for use of quantum mechanics-based sources of entropy, such as from one or more satellites that each operate an independent QRNG in space to produce the random values. Satellite communications are used to directly transmit the random values to the ground stations, and the satellites may perform operations on the random values before distributing the random values among the ground locations (e.g., operations to coordinate with specific key generation parameters and use of key generation schemes). These operations may result in a different source of entropy being provided to each ground location, even as each ground location uses the key generation parameters and scheme to derive a shared secret (e.g., a symmetric key) that is then used to establish a secure communication session (e.g., a TLS connection) and further cryptographic key exchanges.

The following also discusses other variations for the use of the satellite-provided/satellite-generated random values, as part of generating cryptographic keys and establishing secure communications with the cryptographic keys between ground stations and computing locations at separate locations. The use of quantum-based sources of entropy and communication frameworks supports a number of related use cases and communication protocols for high-security settings. These use cases include the secure generation and exchange of cryptographic information at remote sites (e.g., ocean ships, airplanes, and other unconnected stations) located around the world, and entities located on different continents (e.g., financial institutions or companies located in different countries). Additional security protocols for establishing a secure data connection and using this secure data connection are also discussed in the following examples.

As will be understood, the following includes specific reference to the use of cryptographically-secured communications among entities for use cases involving a financial transaction or set of financial transactions, such as the transfer of electronic funds, authorizations, and commands that control or change some financial transaction, data associated with a particular financial asset, etc. The exchange and use of high-quality random values may be useful in a variety of other sensitive or high-security applications. Thus, the techniques discussed herein are not limited to financial activities or use by financial institutions.

FIG. 1 provides an illustration of an example communication environment among a minimum set of entities and systems, involving a first entity 121 labeled "Alice" at Enterprise 1 (e.g., at a first on-Earth geographic location), and a second entity 122 labeled "Bob" at Enterprise 2 (e.g., at a second on-Earth geographic location). In this setting, Alice and Bob want to perform a secure data exchange using a cryptographically secure channel (e.g., a secure tunnel over an existing ground network connection, using a symmetric key used to establish a secure channel for encrypted communications). To accomplish this secure data exchange, Alice and Bob can use a symmetric key that has been generated based on random values from a truly random QRNG entropy source (or sources) and use of an agreed-upon key generation or derivation scheme.

Figure 3:
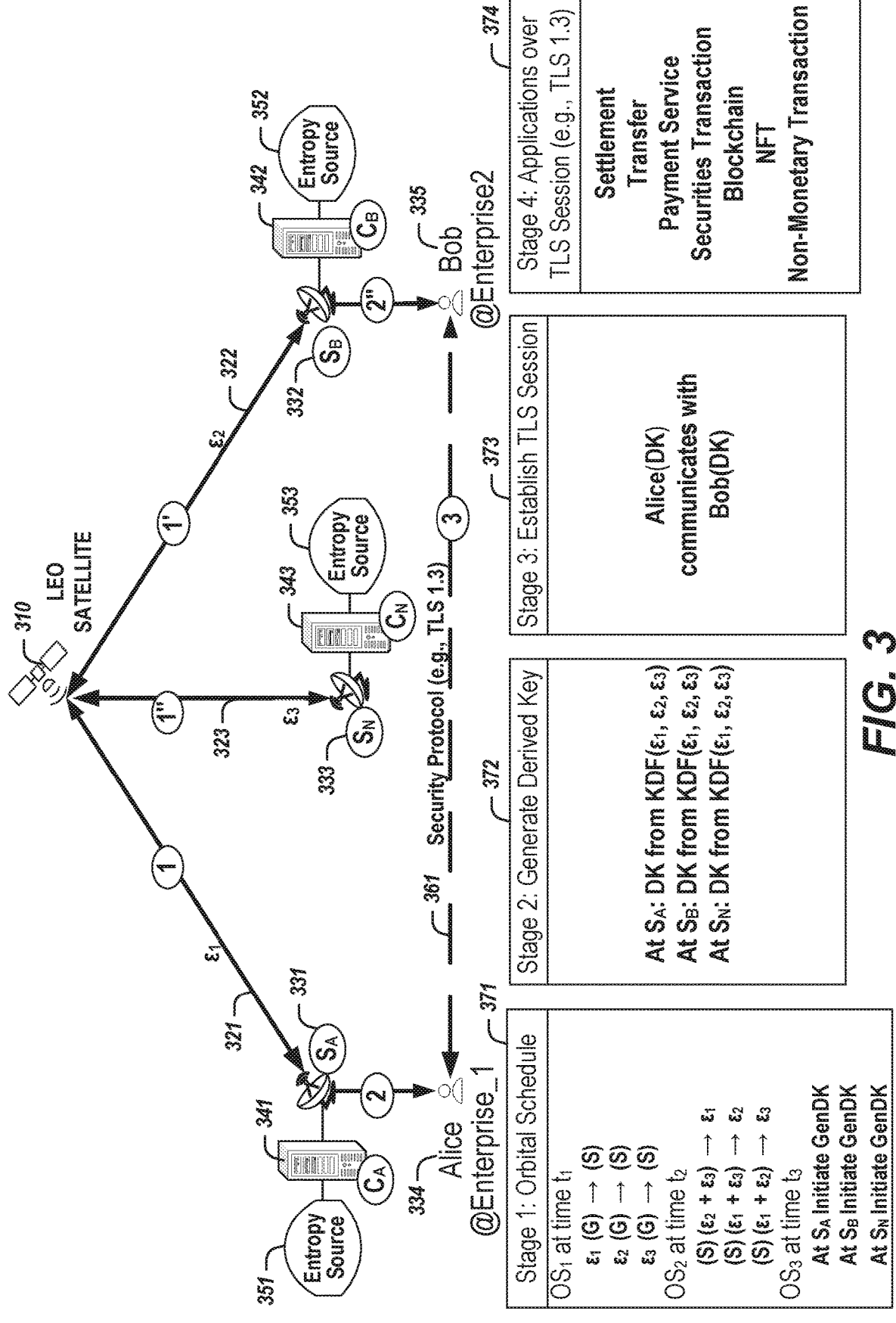
FIG. 3 illustrates an example secure communication scenario involving multiple entities and systems, with the use of ground-based entropy sources.
Figure 4:
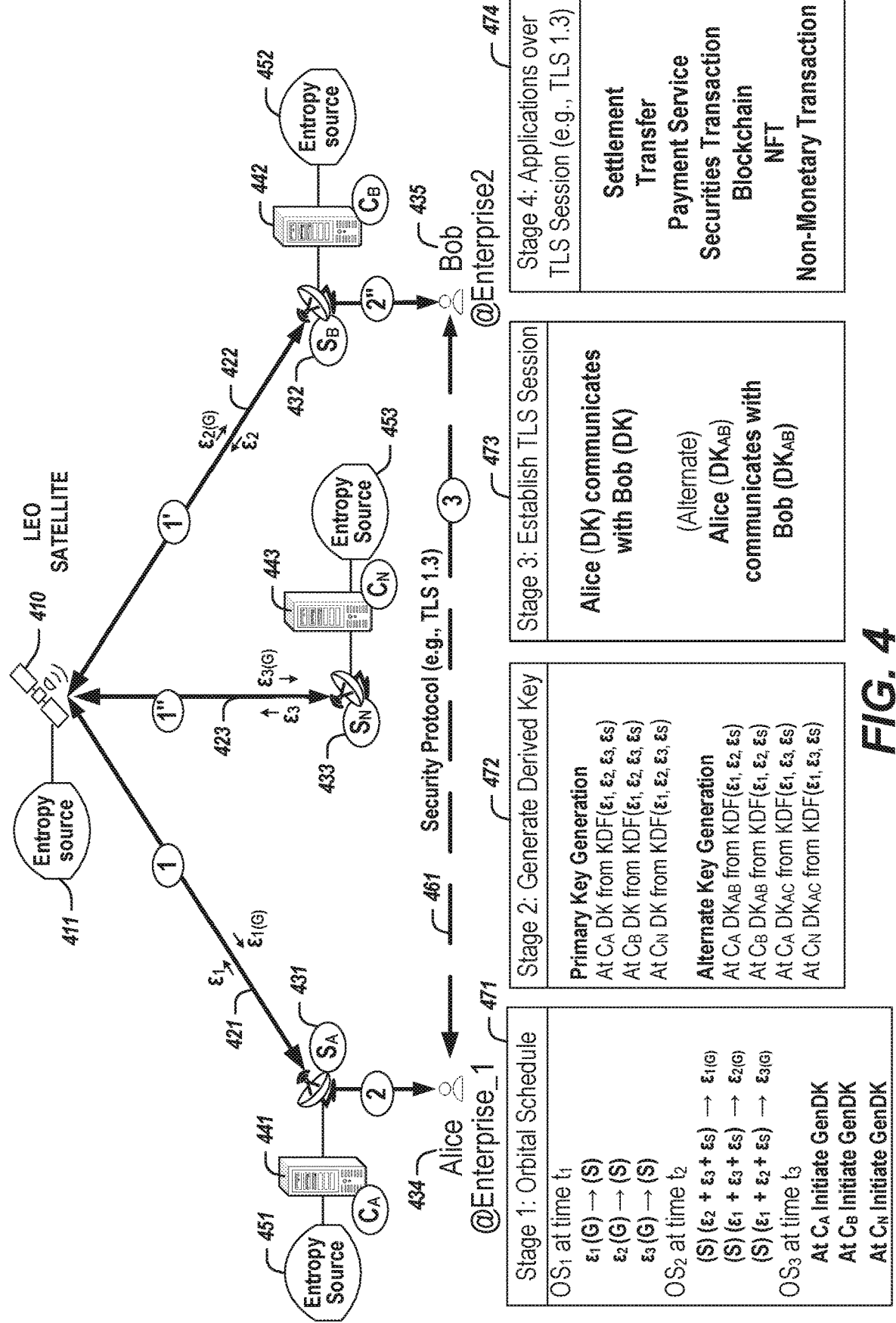
FIG. 4 illustrates an example communication environment among multiple entities and systems, with the use of a satellite-based entropy source in addition to multiple ground-based entropy sources.
Figure 5:
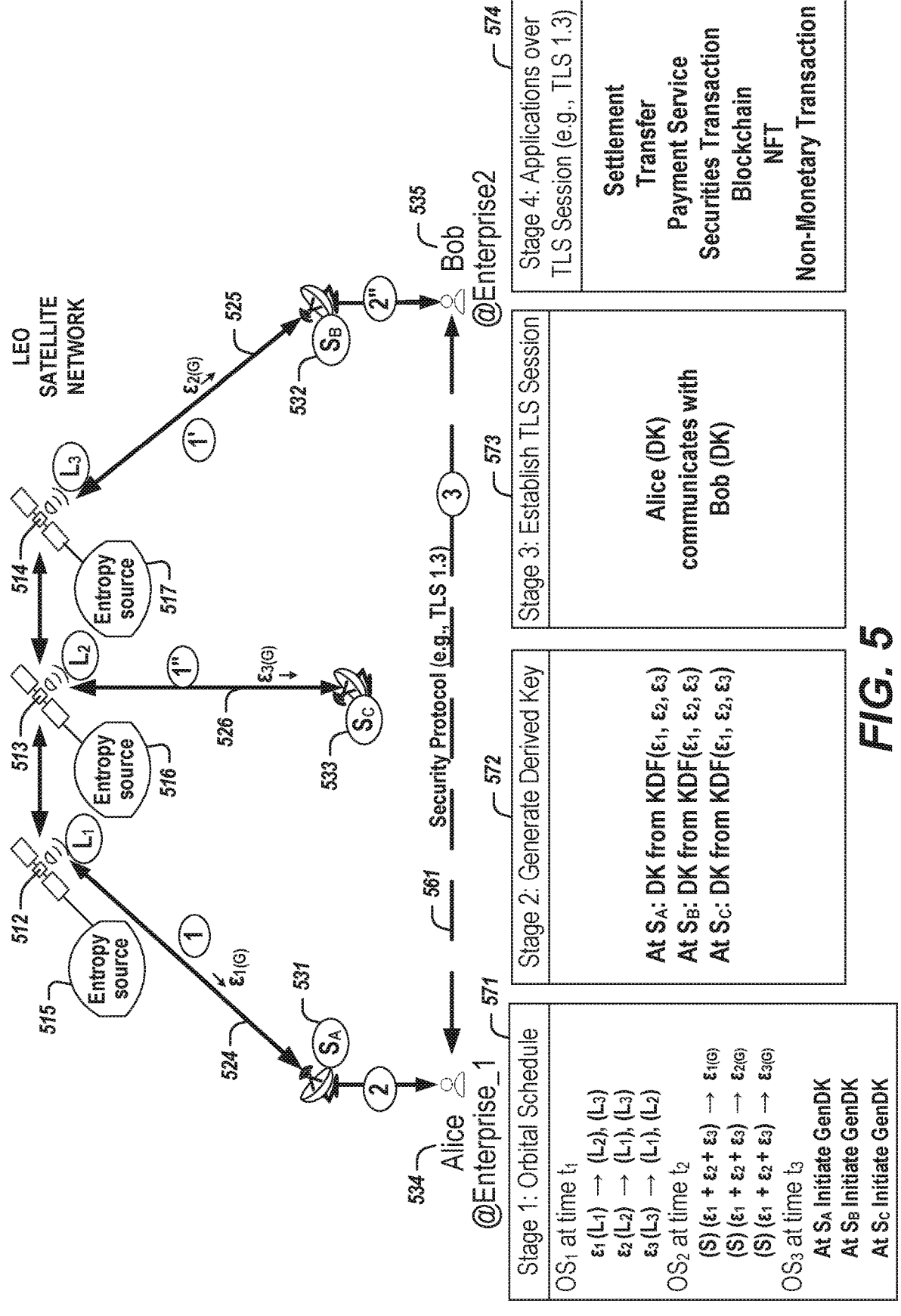
FIG. 5 illustrates an example communication environment among multiple entities and systems, with the use of multiple satellite-based entropy sources.

The security protocol to enable the secure data exchange includes a communication of random values via a satellite network connection with a satellite 110. The random values needed to generate the symmetric key are communicated to a ground station 111 associated with Alice, and a ground station 113 associated with Bob. Thus, Alice and Bob use the satellite network connection to obtain some aspect of security information—here, one or more random values—required in the cryptographic key generation operations. In the simplified version of FIG. 1, the source of the random values is not depicted. FIGS. 3, 4, and 5 provide variations of scenarios where ground-based, satellite-based, or a mix of ground-based and satellite-based entropy sources are used.

While FIG. 1 depicts a secure data exchange only between Alice and Bob, the techniques discussed herein can enable secure communications from Alice or Bob to other entities, such as an entity located at another ground station 112, an entity in motion at a marine location 114 (e.g., cargo ship, yacht, offshore platform, etc.) or an aircraft location 115 (e.g., a commercial or private aircraft, a drone, etc.), a sensor network 116 or Internet of Things devices (not shown), a ground transportation location 117 (e.g., a train, an automobile, etc.), computing servers and data centers, and the like. Additionally, although only one satellite 110 is shown in the example of FIG. 1, the examples discussed herein may involve one or multiple satellites for the generation, communication, and exchange of random values or key generation parameters.

Figure 2:
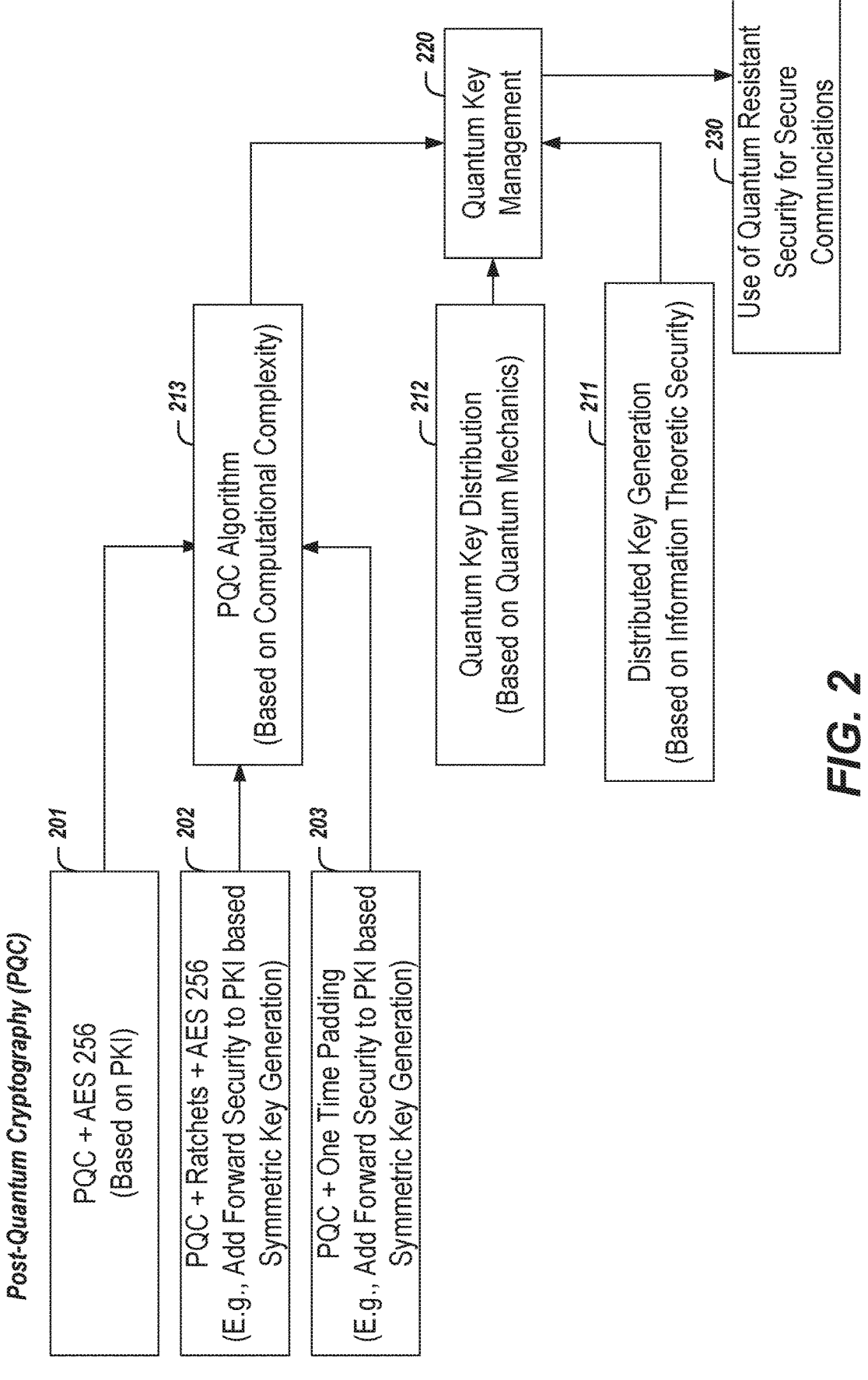
FIG. 2 illustrates multiple approaches for implementing secure communications with quantum-resistant security.

FIG. 2 depicts multiple approaches for implementing secure communications with the use of the techniques discussed herein. Specifically, this diagram depicts how multiple approaches may be used in combination to establish quantum-resistant, cryptographically secure communications 230. These secure communications 230 are established from cryptographic keys and shared secrets provided by quantum key management 220, for quantum-resistant keys produced from the enhanced security of a post-quantum cryptography (PQC) algorithm 213, distributed key generation 211, and quantum key distribution 212.

In detail, a first aspect involves the use of a derived symmetric key that is known only to trusted participants of a transaction, produced from the secure distributed key generation 211 scheme. The security of this key is based on providing the information for generating the key with out-of-band, secure communications. A second aspect involves the use of a quantum key distribution 212 (QKD) method. QKD relates to the exchange of random values (e.g., produced from entangled or unentangled photons) between two endpoints, with these random values typically used to generate symmetric keys. For example, QKD can provide random values for a pre-shared key derivation method used in a secure communication protocol (e.g., a TLS cryptographic protocol). A third aspect involves the use of post-quantum cryptography (PQC) algorithm 213 as a key establishment method, referring to cryptographic algorithms that are understood to be resistant against an attack from a quantum computer. These cryptographic approaches include but are not limited to the generation of cryptographic keys based on: a first key generation algorithm 201 involving PQC and AES-256 (e.g., generating a symmetric key based on public key infrastructure (PKI) principles); a second key generation algorithm 202 involving PQC, AES-256, and a ratchet algorithm (which adds forward security to PKI-based symmetric key generation); or a third key generation algorithm 203 involving PQC and a One Time Padding (which also adds forward security to PKI-based symmetric key generation).

The following describes entropy exchange and key generation scenarios that enable a secure communication channel and secure data exchange—such as transfers of financial transaction data—between two parties. This enables secure communications in settings where there is no pre-existing trusted channel between the two parties. A first stage of these scenarios includes the exchange of random values for cryptographic key generation operations, facilitated via satellite communications. A second stage of these scenarios includes the derivation and use of a shared secret, specifically a symmetric key, to set up a secure link for data transfer. The two parties that use the secure link do not need to be concerned about the limitations of satellite communications—including the short time that an orbiting satellite is accessible to a particular ground station—because the satellite communications are simply used for exchanging random values and/or key generation parameters.

FIG. 3 provides a detailed illustration of an example secure communication scenario involving multiple entities and systems, with the use of ground-based entropy sources. These ground-based entropy sources (e.g., first entropy source 351, second entropy source 352, third entropy source 353) provide QRNG-generated random values for use in deriving a symmetric key/shared secret. The QRNG-generated random values are communicated among the ground stations (e.g., ground station 331, ground station 332, ground station 333) with the use of satellite communication links (e.g., link 321, link 323, link 323) to a LEO satellite or satellites (e.g., LEO satellite 310). Although only one LEO satellite 310 is depicted in this example, a variation may include the use of multiple LEO satellites or other satellite types.

As shown, a first entropy source 351 is located at a compute location 341 (Compute Location A, labeled as $C_A$) associated with ground station 331 (Station A, labeled as $S_A$), both operating on behalf of a first entity 334 labeled "Alice"; a second entropy source 352 is located at a compute location 342 (Compute Location B, labeled as $C_B$) associated with ground station 332 (Station B, labeled as $S_B$), both operating on behalf of a second entity 335 labeled "Bob"; a third entropy source 353 is located at a compute location 343 $C_N$ associated with ground station 333 $S_N$, operating on behalf of a third entity (unlabeled). Here, station $S_N$ and compute location $C_N$ are labeled to indicate that any N number of entropy sources, compute locations, and ground stations can be used in this arrangement.

An orbital path of the LEO satellite 310 typically involves completing a full orbit around the Earth every 90 to 120 minutes, depending on altitude of the orbit. The random values obtained from a QRNG at a respective entropy source may be communicated from Earth, to the LEO satellite 310, and then back to Earth according to the following orbital schedule starting at stage 371.

At a first time period ($t_1$) of the orbital schedule shown in stage 371, corresponding to a first orbit of the LEO satellite 310, the random value $E_1$ is provided to the LEO satellite 310 with a communication via the link 321, the random value $E_2$ is communicated to the LEO satellite 310 with a communication via the link 322, and the random value $E_3$ is communicated to the LEO satellite 310 with a communication via the link 323, and so on. This time period $t_1$ may include a period of minutes or hours, as the LEO satellite 310 orbits around the earth.

At a second time period ($t_2$) of the orbital schedule shown in stage 371, corresponding to a second or subsequent orbit of the LEO satellite 310, the LEO satellite 310 will provide other random values to the ground stations that are required for the key derivation function. For example, ground station 331 would receive the random values $E_2$ and $E_3$, or a value derived from a combination of $E_2$ and $E_3$. The ground station 332 would likewise receive the random values $E_1$ and $E_3$ (or a derived value from these random values) and the ground station 333 would receive the random values $E_1$ and $E_2$ (or a derived value from these random values). No transmission from the LEO satellite 310 will include all three random values, and thus a rogue actor would be unable to correctly derive the key even if the actor is somehow able to intercept the satellite transmission or perform a man-in-the-middle attack.

At a third time period ($t_3$) of the orbital schedule shown in stage 371, after the random values have been distributed to the ground stations, each of the ground stations 331, 332, 333 (or the compute locations 341, 342, 343 associated with these ground stations) can initiate a key generation algorithm. The key generation algorithm is detailed in stage 372. For instance, at station $S_A$, a key derivation function KDF uses random value $E_1$ (generated from first entropy source 351, and known to $S_A$) and random values $E_2$ and $E_3$ (provided from the LEO satellite 310) to produce a symmetric key—a shared secret labeled as derived key DK. At stations $S_B$ and $S_N$, the DK may also be generated from the random values $E_1$, $E_2$, and $E_3$. At the conclusion of this stage 372, each of the stations now has derived the symmetric key.

Once the symmetric key has been generated at multiple locations, the respective stations can begin use of the key to communicate with each other. At stage 373, this involves the use of TLS session to negotiate a key exchange, which is then used to create a secure communication tunnel 361 between Alice and Bob. At stage 374, Alice and Bob can directly communicate over the secure communication tunnel 361 over a network (a terrestrial or non-terrestrial network) and safely transmit data associated with sensitive applications such as financial settlement, funds transfers, non-fungible token (NFT) transactions, payment servicing, secure messaging, and the like.

In some examples, the key used in the TLS session may have a defined time to live (TTL) or validity period, such as a daily key that expires every 24 hours. The secure communication tunnel 361, once established, can be used to communicate a new key, new random values for new key generation (or derivation) procedures, or new key generation (or derivation) parameters for a subsequent communication session. Thus, the stages 371, 372, 373 and/or aspects of the satellite communications may be repeated to propagate secure keys or key information and re-establish a secure communication tunnel between entities.

FIG. 4 provides a detailed illustration of an example communication environment among multiple entities and systems, with the use of one satellite-based entropy source in addition to multiple ground-based entropy sources. As in the scenario of FIG. 3, a first entity 434 labeled "Alice" is associated with a first ground station 431 $S_A$, and a second entity 435 labeled "Bob" is associated with a second ground station 432 $S_B$.

In this scenario, ground entropy sources (e.g., first entropy source 451 at a compute location 441 associated with ground station 431 $S_A$, second entropy source 452 at a compute location 442 associated with ground station 432 $S_B$, third entropy source 453 at a compute location 443 associated with ground station 433 $S_N$) provide random values $E_1$, $E_2$, $E_3$ respectively to the LEO satellite 410 via the links 421, 422, 423. A satellite entropy source 411 also operates to generate an random value $E_S$ using a QRNG onboard the LEO satellite 410.

The entropy communication and key generation stages are modified to include the use of the satellite-generated random value $E_S$. At a first time period $(t_1)$ of the orbital schedule shown in stage 471, corresponding to a first orbit of the LEO satellite 410, the random value $E_1$ is provided to the LEO satellite 410 with a communication via the link 421, the random value $E_2$ is communicated to the LEO satellite 410 with a communication via the link 422, and the random value $E_3$ is communicated to the LEO satellite 410 with a communication via the link 423, and so on. This time period $t_1$ may involve minutes or hours, as the LEO satellite 410 orbits around the earth.

At a second time period $(t_2)$ of the orbital schedule shown in stage 471, corresponding to a second or subsequent orbit of the LEO satellite 410, the LEO satellite 410 will provide a random value $E_S$ from entropy source 411 in combination with other random values that are required for the key derivation function. For example, ground station 431 would receive the random values $E_2$, $E_3$, and $E_S$, or a value derived from a combination of these random values. The ground station 432 would likewise receive the random values $E_1$, $E_3$, and $E_S$, (or a derived value from these random values) and the ground station 433 would receive the random values $E_1$, $E_2$, and $E_S$ (or a derived value from these random values).

At a third time period $(t_3)$ of the orbital schedule shown in stage 471, after the random values have been distributed to the ground stations, each of the compute locations 441, 442, 443 associated with the ground stations 431, 432, 433 can initiate a key generation algorithm. The key generation algorithm is detailed in stage 472, with a primary and an alternate example of a key generation algorithm. As a primary example, at compute location 441 $C_A$, a key derivation function KDF uses random value $E_1$ (generated from first entropy source 451, and known to $C_A$) and random values $E_2$, $E_3$, and $E_S$ (provided via and at the LEO satellite 410) to produce the derived key (DK). At compute locations 442, 443 corresponding to $C_B$ and $C_N$, the DK may also be generated from the random values $E_1$, $E_2$, $E_3$, and $E_S$. As an alternate example, the key generation algorithm may produce keys that are specific to some combination of entities and/or entropy sources. For example, to enable communication between entities A and B, the random values $E_1$, and $E_2$—which are produced by entropy sources associated with entities A and B—can be used in combination with the satellite-generated entropy source $E_S$.

At the conclusion of this stage 472, each of the ground stations has derived the symmetric key, labeled as "DK" in the primary generation approach, and labeled as "$DK_{AB}$" with the alternate generation approach. At stage 473, the DK (or $DK_{AB}$) can be used to establish a TLS session to create a secure communication tunnel 461 between Alice and Bob. At stage 474, Alice and Bob can directly communicate over the secure communication tunnel 461, as discussed with the examples above.

FIG. 5 provides a detailed illustration of an example communication environment among multiple entities and systems, with the use of multiple satellite-based entropy sources and no ground-based entropy sources. In this scenario, satellite entropy sources (e.g., first entropy source 515 at LEO satellite 512, second entropy source 516 at LEO satellite 513, third entropy source 517 at LEO satellite 514) are coordinated to provide random values to respective ground stations. The ground stations include ground station 531 $S_A$, ground station 532 $S_B$, and ground station 533 $S_C$.

In this scenario, satellite-only entropy sources (e.g., first entropy source 515 at a first LEO satellite 512 $L_1$, second entropy source 516 at a second LEO satellite 513 $L_2$, third entropy source 517 at a third LEO satellite 514 $L_3$) provide random values $E_1$, $E_2$, $E_3$ to each other. At a first time period $(t_1)$ of the orbital schedule shown in stage 571, which may be less than a first orbit of the LEO satellites, the random values may be communicated via inter-satellite links between LEO satellite 512 $L_1$ and LEO satellite 513 $L_2$, and between LEO satellite 513 $L_2$ and LEO satellite 514 $L_3$ (or other satellite connections not depicted).

At a second time period $(t_2)$ of the orbital schedule shown in stage 571, a combination of the random values $E_{1(G)}$ is provided to the ground station 531 $S_A$ via the link 524, a combination of the random values $E_{2(G)}$ is provided to the ground station 532 $S_B$ via the link 525, and a combination of the random values $E_{3(G)}$ is provided to the ground station 533 $S_C$ via the link 526. At a third time period $(t_3)$ of the orbital schedule shown in stage 571, after the random values have been distributed to the ground stations, the ground stations 531, 532, 533 can initiate a key generation algorithm.

The remaining stages 572, 573, and 574 may operate similar to those discussed with reference to FIGS. 3 and 4. These may include generating the derived key (DK), establishing the secure communication channel 561, and performing applications over the secure communication channel 561. As shown, a first entity 534 labeled "Alice" (associated with the ground station 531 $S_A$) can then securely communicate with second entity 535 labeled "Bob" (associated with the ground station 532 $S_B$).

Other variations to the approaches above may involve randomly sampling values from different QRNG sources. For instance, if there are three available sources of entropy, then an entity may sample one of the sources randomly during each run of the key generation. In other examples, one or more of the random sources may also be provided from a remote computing service operating as an "Entropy-as-a-service" (EaaS). For instance, an EaaS deployment may provide additional ground-based random values from a QRNG on-demand. In still other examples, additional variation and sources of entropy may be provided from an array of a large list of random numbers, a probabilistic random number generator (PRNG), or other deployments or configurations of QRNGs.

Additional security can be achieved by the use of variations in key generation schemes, including what particular data values are used for the generation of the derived key.

FIG. 6 illustrates multiple approaches for the use of key generation parameters (KGPs), for use with the communication settings discussed above.

In a first mode (Mode 1 601), a particular compute location such as the compute location A (C$_A$) (e.g., compute location 441) determines the KGPs, and C$_A$ pushes the KGPs to the LEO satellite (e.g., LEO satellite 410). The LEO then pushes the KGPs to other client stations (e.g., ground locations C$_B$, C$_C$, etc.).

In a second mode (Mode 2 602): A LEO satellite determines the KGPs. The LEO satellite pushes the determined KGPs to all of the client stations (e.g., ground locations C$_A$, C$_B$, C$_C$, etc.).

In a third mode (Mode 3 603): All client stations (ground locations) separately determine the KGPs. The LEO satellite selects one of the client stations to obtain the KGPs for use. The LEO satellite then provides the selected KGPs to the other client stations for use.

Other variations may include changes to KGPs that are distributed at regular intervals, and the use of pre-launch KGPs and failover KGPs. For example, pre-launch KGPs may be known for an initial communication session between ground stations to securely communicate communication schemes and changes to the KGPs. A set of failover KGPs may be known to entities to help establish communication sessions when connectivity to the LEOs has been interrupted or is unavailable. Other types of pre-shared or pre-agreed KGPs (including KGPs securely shared with air-gapped physical delivery, or KGPs shared with quantum-protected security) may be exchanged and used.

Figure 7:
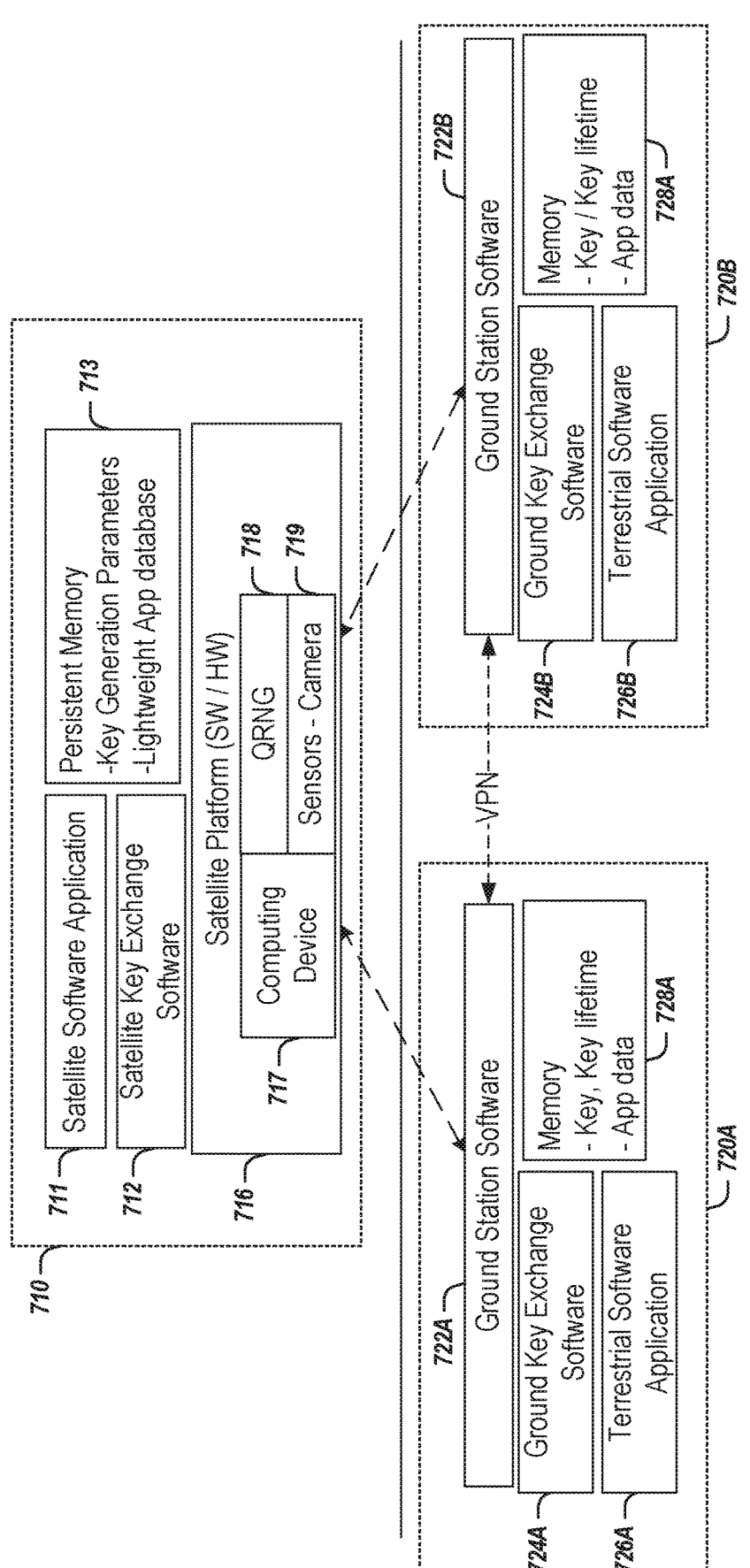
FIG. 7 illustrates example hardware and software components at satellite and ground stations used for the exchange of random values and key establishment.

FIG. 7 provides a detailed illustration of example hardware and software components at satellite and ground stations used for the exchange of random values and key establishment, according to the present techniques. First, this illustration shows the use of a Satellite Station 710, such as may be implemented at the LEO satellites 110, 310, 410, 512, 513, 514, discussed above. FIG. 7 also shows the use of Ground Station 720A and Ground Station 720B, such as may be implemented at the ground stations 111, 112, 331, 332, 333, 431, 432, 433, 531, 532, and 533, discussed above. In other examples, the Ground Station 720A and Ground Station 720B may be implemented at the compute locations 341, 342, 343, 441, 442, 443, discussed above.

The Satellite Station 710 includes a satellite software application 711 used for managing entropy generation and distribution functions, and satellite key exchange software 712 used for determining and providing key generation parameters. The Satellite Station 710 includes memory 713 such as persistent memory to store the key generation parameters and a lightweight database for use with the satellite software application 711. The Satellite Station 710 also includes a platform 716 of hardware or software components, including a computing device 717, a QRNG 718, and sensors 719 (e.g., a camera). Other hardware and software elements may operate on the Satellite Station 710.

The Ground Station 720A and Ground Station 720B are communicatively coupled to each other, such as via a VPN used to provide an encrypted communication channel established with a symmetric key as discussed above. Each of the ground stations include ground station software 722A, 722B to process satellite transmissions, ground key exchange software 724A, 724B to receive and utilize the key generation parameters, a terrestrial software application 726A, 726B to coordinate the key establishment and use of the key by other software applications, and memory 728A, 728B to store a key, a key lifetime, and application data.

Figure 8:
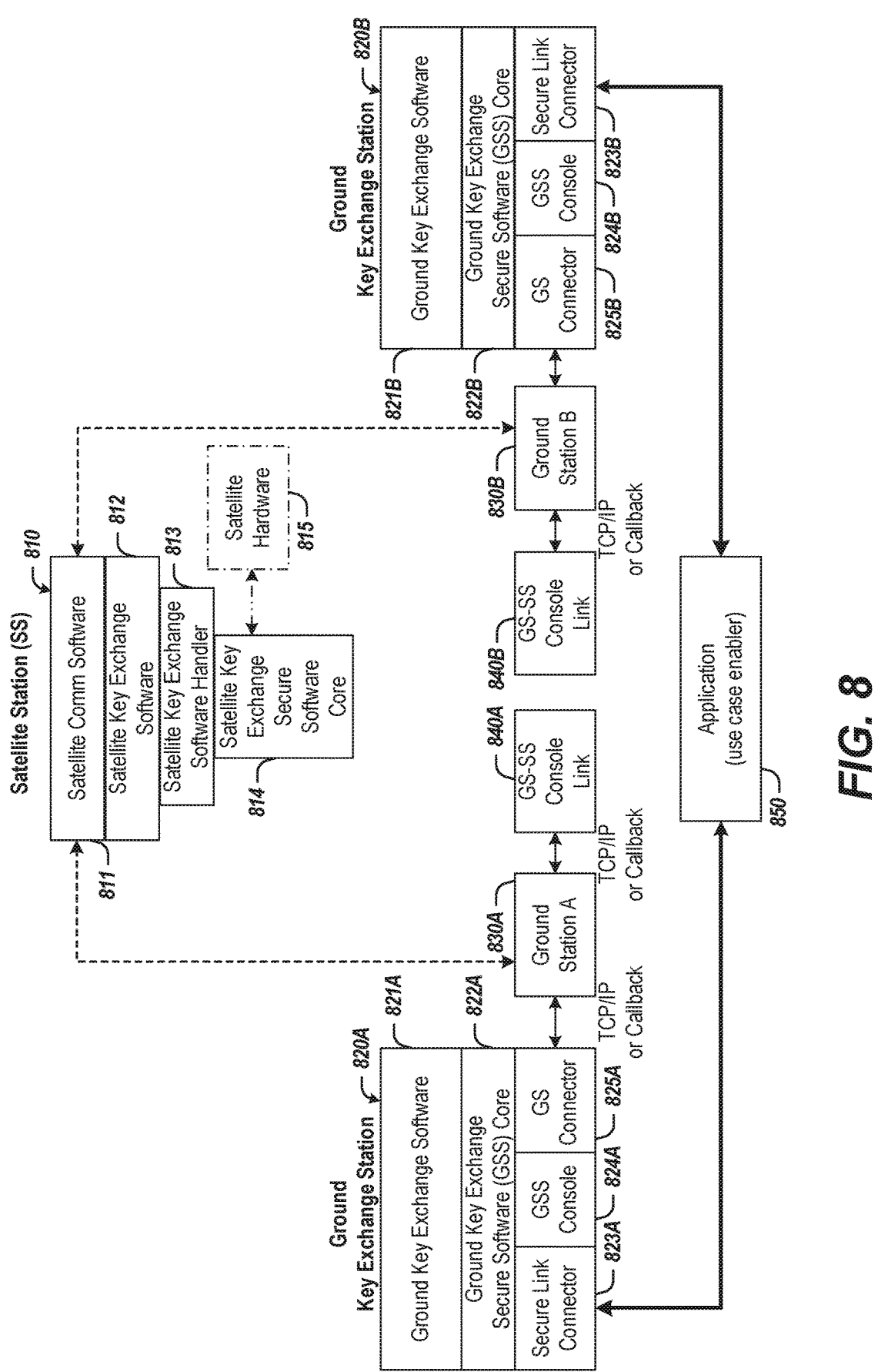
FIG. 8 illustrates additional software and hardware components provided among ground station and satellite station locations.

FIG. 8 illustrates additional software and hardware components provided among ground station and satellite station locations. Here, a Satellite Station 810 is connected to a first Ground Station 830A and a second Ground Station 830B. The Ground Stations 830A, 830B include some of the features from the Ground Stations 720A, 720B as noted in FIG. 7. The Satellite Station 810 includes some of the features from the Satellite Station 810 as noted in FIG. 7. However, separate compute locations—specifically, Ground Key Exchange Stations 820A, 820B—operate to establish and use the key. Thus, in this arrangement, the Ground Stations 830A, 830B are only used for Satellite Station communications.

The Satellite Station 810 includes satellite communications software 811 to communicate with the Ground Station 830A and the Ground Station 830B, and satellite key exchange software 812 to coordinate the distribution of random values to the Ground Stations 830A, 830B. The Satellite Station 810 also includes a satellite key exchange software handler 813 and satellite key exchange secure software core 814. The satellite key exchange secure software core 814 interfaces with satellite hardware 815 (not shown for simplicity).

The Ground Station 830A and Ground Station 830B are operably coupled to the Ground Key Exchange Station 820A and the Ground Key Exchange Station 820B respectively via a TCP/IP or Callback connection. The Ground Station 830A and the Ground Station 830B are operably coupled to a Ground Station-Satellite Station console link 840A, 840B respectively via another TCP/IP or Callback connection. This console link 840A, 840B may be used to receive inputs, commands, and provide diagnostics, and discussed below with reference to FIGS. 9A and 9B.

The Ground Key Exchange Station 820A and Ground Key Exchange Station 820B respectively include ground key exchange software 821A, 821B used to coordinate the key establishment and key use operations, and a ground key exchange secure software (GSS) core 822A, 822B providing an operating system platform to operate the ground key exchange software. Each ground station includes a secure link connector 823A, 823B to establish a secure tunnel using a symmetric key, and a GSS console 824A, 824B to receive inputs/provide inputs to an administrative user.

Once the symmetric key is generated at both ground locations, an application 850 (which enables respective use cases, such as financial transactions) can be accomplished via a secure communication channel between Ground Key Exchange Station 820A and Ground Key Exchange Station 820. This secure communication channel is established via the secure link connector 823A and the secure link connector 823B.

Figure 9A:
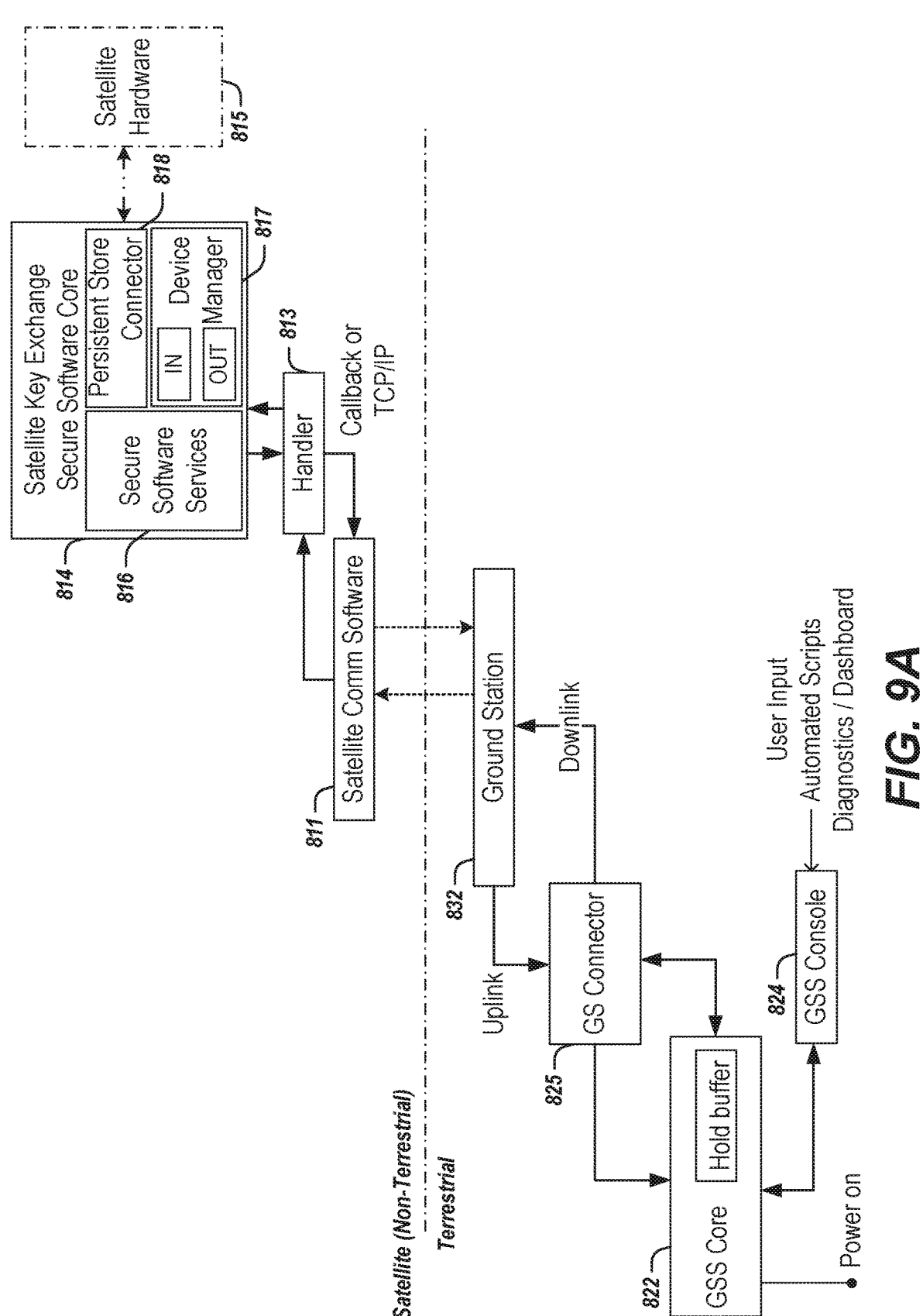
FIGS. 9A and 9B illustrate operational data flows among hardware components among ground station and satellite station locations.

FIG. 9A illustrates a first operational data flow among hardware components of FIGS. 7 and 8. This operational data flow includes operations performed by the satellite (non-terrestrial) entities on the top half of the drawing; contrasted with operations performed by the ground (non-terrestrial) entities on the bottom half of the drawing. This operational data flow shows additional aspects of the secure software core 814 operating at the satellite location, including secure software services 816, a device manager 817, and a persistent store connector 818. This operational data flow also shows how a GSS console 824 may receive user input, automated scripts, and commands, while providing output in the form of diagnostics or dashboard information.

Figure 9B:
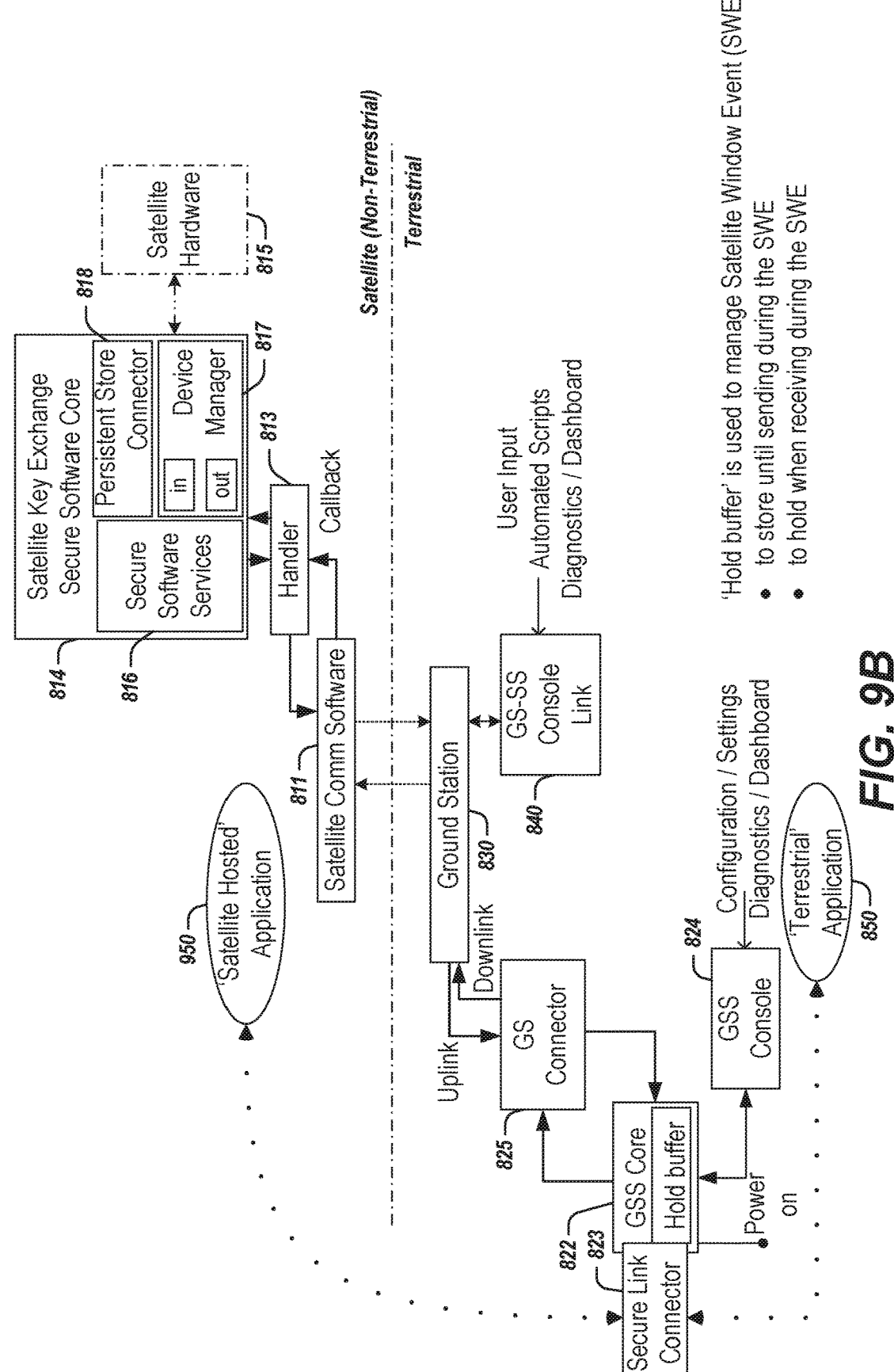

FIG. 9B also illustrates another operational data flow among the hardware components of FIGS. 7 and 8. This operational data flow shows how the GSS core 822 receives inputs from a GSS console 824 in the form of configuration and settings, while providing diagnostics and dashboard outputs. Additionally, the GS-SS console link 840 may receive user input, automated scripts, and commands, while providing output in the form of diagnostics or dashboard information. This operational data flow also shows the use of a satellite-hosted application 950 in addition to the terrestrial application 850. This shows that the encryption techniques may enable a combination of ground-based and satellite-based secure communication use cases.

Accordingly, the secure communication channel that is established with the present techniques may be used to facilitate a variety of monetary and non-monetary transactions and data exchanges/transfers. Such transactions include but are not limited to: data transfers for large monetary values; real estate transfers; non-monetary transactions as defined by ASC 845; blockchain, non-fungible token (NFT), and digital ledger transactions and operations; electronic contract transactions and tasks; just-in-time security values to accompany transactions requiring/requesting additional security; confidential or sensitive communication tunnels; large cryptographic data transfers; or use cases where traditional communication channels are not possible or present a risk of interception.

FIG. 10 illustrates a flowchart 1000 of an example method, performed by a computing system and implementing software operating at a terrestrial location, for generating a cryptographic key based on satellite-provided random values. It will be understood that additional operations or substitute operations may be performed in connection with this process (e.g., based on the data operations discussed above with FIGS. 1 to 5).

Operation 1005 includes receiving a first random value that is generated by a first quantum random number generator at the terrestrial location.

Operation 1010 includes receiving a second random value and a third random value via at least one satellite communication. This second random value is generated by a second quantum random number generator and this third random value is generated by a third quantum random number generator. For instance, the second quantum random number generator may be located at a first satellite, and the third quantum random number generator may be located at a second terrestrial location.

Operation 1015 includes performing a key derivation function on the first random value, the second random value, and the third random value. For example, the key derivation function may be performed on a result of a Boolean function that provides a combination of the first random value, the second random value, and the third random value.

Operation 1020 includes generating a cryptographic key based on the key derivation function (e.g., a key derivation function which uses some combination of the first random value, the second random value, and the third random value). In some examples, generating the cryptographic key is based on key generation parameters provided from a satellite, and/or determined by the satellite or another terrestrial location.

Operation 1025 includes establishing an encrypted communication session between the terrestrial location and a second terrestrial location, based on use of the cryptographic key. This encrypted communication session may be a TLS session, as explained above.

FIG. 11 illustrates a flowchart 1100 of an example method, performed by a computing system and implementing software operating at a satellite location, for communicating random values used for cryptographic key generation.

It will be understood that additional operations or substitute operations may be performed in connection with this process (e.g., based on the sequence of data operations depicted in FIGS. 1 to 5).

Operation 1105 includes establishing at least one satellite communication with a terrestrial location. This terrestrial location may obtain a first random value using a first quantum random number generator at the terrestrial location.

Operation 1110 includes transmitting a second random value and a third random value to the terrestrial location via the at least one satellite communication. In this setting, the second random value is generated by a second quantum random number generator and the third random value is generated by a third quantum random number generator.

Operation 1115 includes optionally performing a Boolean function on the second random value and a third random value (and, additional random values as applicable).

Operation 1120 includes transmitting the second random value and the third random value to the terrestrial location via the at least one satellite communication. If a Boolean function has been applied, the transmitting of the second random value and a third random value provides a value based on the Boolean function.

Operation 1125 includes transmitting key generation parameters associated with cryptographic key generation.

Operation 1130 includes causing or enabling the terrestrial location to generate a cryptographic key based on the first random value, the second random value, and the third random value, based on the key generation parameters.

FIG. 12 illustrates a flowchart 1200 of an example method, performed by a computing system and implementing software operating at a terrestrial location, for generating a cryptographic key based on multiple satellite-generated random values. It will be understood that additional operations or substitute operations may be performed in connection with this process (e.g., based on the operations discussed above with FIGS. 1-to 5).

Operation 1205 includes receiving a first random value (e.g., generated by a QRNG at a first satellite location) via at least one satellite communication. Operation 1210 includes receiving a second random value (e.g., generated by a QRNG at a second satellite location) via the at least one satellite communication. Operation 1215 optionally includes receiving a third or more random value (e.g., generated by a QRNG at a third or additional satellite location) via the at least one satellite communication.

Operation 1220 includes performing a key derivation function on the first random value and the second random value (and, if applicable, additional random value(s)). This may include a key derivation function performed on a result of a Boolean function that provides a combination of the first random value and the second random value.

Operation 1225 includes generating the cryptographic key (e.g., a symmetric key) based on at least the first random value and the second random value.

Operation 1230 includes establishing an encrypted communication session between the terrestrial location and a second terrestrial location, based on use of the cryptographic key.

FIG. 13 illustrates a flowchart 1300 of a method performed by a computing system and implementing software operating at a satellite location, for providing entropy used in cryptographic key generation, based on multiple satellite-generated random values. It will be understood that additional operations or substitute operations may be performed in connection with this process (e.g., based on the data operations discussed above with FIGS. 1-5).

Operation 1305 includes obtaining a first random value generated in the non-terrestrial network (e.g., using a QRNG process of the non-terrestrial network). Operation 1310 includes obtaining a second random value generated in the non-terrestrial network (using the same or another QRNG process of the non-terrestrial network).

Operation 1315 includes optionally performing a Boolean function on the first random value and the second random value.

Operation 1320 includes transmitting the first random value to a terrestrial location in a first satellite communication from the non-terrestrial network. Operation 1325 includes transmitting the second random value to the terrestrial location in a second satellite communication from the non-terrestrial network.

Operation 1330 includes causing the terrestrial location to perform key generation using the random value(s) (as coordinated with other terrestrial locations).

Figure 14:
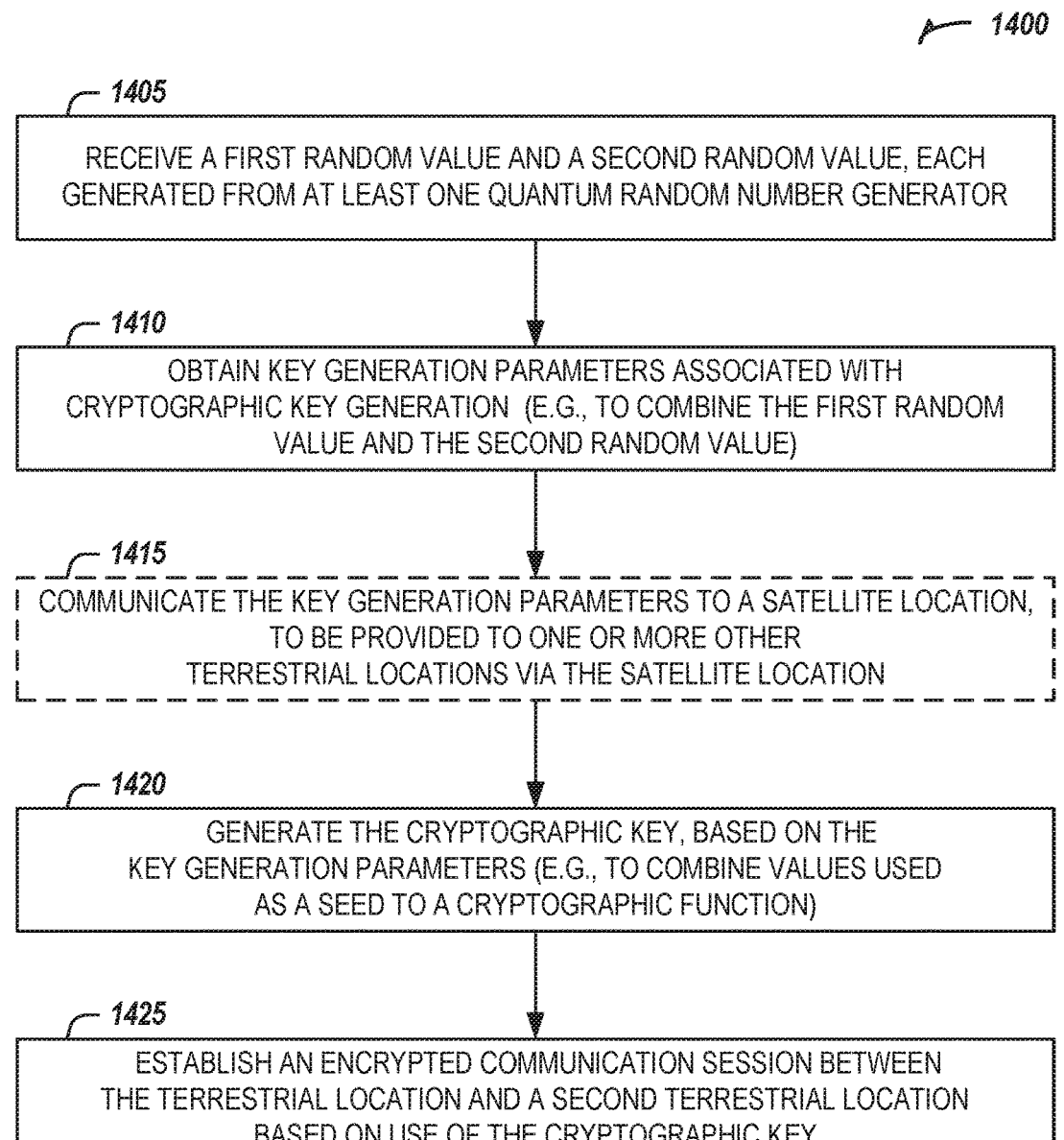
FIG. 14 illustrates a flowchart of a method performed by a computing system operating at a terrestrial location for generating a cryptographic key based on a key generation scheme.

FIG. 14 illustrates a flowchart 1400 of a method performed by a computing system and implementing software operating at a terrestrial location, for generating a cryptographic key based on a key generation scheme. It will be understood that additional operations or substitute operations may be performed in connection with this process (e.g., based on the data operations discussed above with FIGS. 1-5, and with the key derivation functions discussed with reference to FIG. 6).

Operation 1405 includes receiving a first random value and a second random value generated from at least one quantum random number generator, with at least one of the first random value and the second random value being provided from a satellite communication.

Operation 1410 includes obtaining key generation parameters associated with cryptographic key generation. The key generation parameters specify a combination of the first random value and the second random value.

Operation 1415 includes optionally communicating the key generation parameters to a satellite location, so that the key generation parameters can be provided to one or more other terrestrial locations via the satellite. Other approaches for coordinating and selecting the key generation parameters may also be provided.

Operation 1420 includes generating the cryptographic key, using the combination of the first random value and the second random value as a seed to a cryptographic function.

Operation 1425 includes establishing an encrypted communication session between the terrestrial location and a second terrestrial location, based on use of the cryptographic key.

FIG. 15 is a flowchart 1500 of a method performed by a computing system and implementing software operating at a satellite location, for enabling cryptographic generation based on a key generation scheme, according to an embodiment. It will be understood that additional operations or substitute operations may be performed in connection with this process (e.g., based on the data operations discussed above with FIGS. 1-5, and with the key derivation functions discussed with reference to FIG. 6).

Operation 1505 includes obtaining at least one random value generated from at least one quantum random number generator.

Operation 1510 includes transmitting the at least one random value to a terrestrial location.

Operation 1515 includes obtaining key generation parameters associated with cryptographic key generation, with the key generation parameters specifying a combination of the at least one random value with at least one additional random value.

Operation 1520 includes transmitting the key generation parameters to the terrestrial location.

Operation 1525 includes optionally transmitting the key generation parameters to one or more other terrestrial locations.

Operation 1530 includes causing the terrestrial location and other terrestrial locations to perform key generation using the key generation parameters and the random value (s).

Additional examples of the presently described embodiments include the following, non-limiting implementations. Each of the following non-limiting examples may stand on its own or may be combined in any permutation or combination with any one or more of the other examples provided below or throughout the present disclosure.

Example 1 is a method performed by a computing system operating at a terrestrial location for generating a cryptographic key based on satellite-provided entropy, the method comprising: receiving a first random value, the first random value generated by a first quantum random number generator at the terrestrial location; receiving a second random value and a third random value via at least one satellite communication, the second random value generated by a second quantum random number generator and the third random value generated by a third quantum random number generator; and generating a cryptographic key based on the first random value, the second random value, and the third random value.

In Example 2, the subject matter of Example 1 optionally includes subject matter wherein the second quantum random number generator is located at a first satellite.

In Example 3, the subject matter of Example 2 optionally includes subject matter wherein the third quantum random number generator is located at a second terrestrial location.

In Example 4, the subject matter of any one or more of Examples 1-3 optionally include subject matter wherein the second quantum random number generator is located at a second terrestrial location.

In Example 5, the subject matter of Example 4 optionally includes subject matter wherein the third quantum random number generator is located at a third terrestrial location.

In Example 6, the subject matter of any one or more of Examples 1-5 optionally include receiving at least one additional random value via the at least one satellite communication; wherein generating the cryptographic key is further based on the at least one additional random value.

In Example 7, the subject matter of any one or more of Examples 1-6 optionally include subject matter wherein generating the cryptographic key includes: performing a key derivation function based on the first random value, the second random value, and the third random value.

In Example 8, the subject matter of Example 7 optionally includes subject matter wherein the key derivation function is performed on a result of a Boolean function that provides a combination of the first random value, the second random value, and the third random value.

In Example 9, the subject matter of any one or more of Examples 1-8 optionally include establishing an encrypted communication session between the terrestrial location and a second terrestrial location based on use of the cryptographic key, wherein the cryptographic key is a symmetric key that is derived at the terrestrial location and the second terrestrial location based on the first random value, the second random value, and the third random value.

In Example 10, the subject matter of Example 9 optionally includes subject matter wherein the encrypted communication session provides data associated with at least one financial transaction.

In Example 11, the subject matter of any one or more of Examples 1-10 optionally include subject matter wherein the at least one satellite communication is conducted with at least one low earth orbit (LEO) satellite, and wherein the terrestrial location comprises a ground station used for communication with the at least one LEO satellite or a compute system associated with the ground station.

In Example 12, the subject matter of Example 11 optionally includes subject matter wherein generating the cryptographic key is based on key generation parameters provided from the at least one LEO satellite, and wherein the key generation parameters are determined by the at least one LEO satellite or another terrestrial location.

Example 13 is a machine-readable medium (e.g., a non-transitory machine-readable storage medium) including instructions, which when executed by a machine, cause the machine to perform the methods of any of the Examples 1 to 12.

Example 14 is a computing system, comprising: at least one processor; and a memory device comprising instructions, which when executed by the processor, cause the processor to perform of the methods of any of Examples 1 to 12.

Example 15 is a communication device, comprising: networking hardware; and a memory device comprising instructions, which when executed by the networking hardware, cause the networking hardware to perform network operations according to the methods of any of Examples 1 to 12.

Example 16 is a method performed by a computing system operating at a satellite for communicating random values used for cryptographic key generation, the method comprising: establishing at least one satellite communication with a terrestrial location, the terrestrial location to obtain a first random value using a first quantum random number generator at the terrestrial location; transmitting a second random value and a third random value to the terrestrial location via the at least one satellite communication, the second random value generated by a second quantum random number generator and the third random value generated by a third quantum random number generator; and transmitting key generation parameters associated with cryptographic key generation, the key generation parameters to enable the terrestrial location to generate a cryptographic key based on the first random value, the second random value, and the third random value.

In Example 17, the subject matter of Example 16 optionally includes subject matter wherein the second quantum random number generator is located at the satellite.

In Example 18, the subject matter of Example 17 optionally includes subject matter wherein the third quantum random number generator is located at another satellite connected via an inter-satellite link to the satellite.

In Example 19, the subject matter of Example 18 optionally includes subject matter wherein the third quantum random number generator is located at a second terrestrial location.

In Example 20, the subject matter of any one or more of Examples 16-19 optionally include subject matter wherein the second quantum random number generator is located at a second terrestrial location.

In Example 21, the subject matter of Example 20 optionally includes subject matter wherein the third quantum random number generator is located at a third terrestrial location.

In Example 22, the subject matter of any one or more of Examples 16-21 optionally include transmitting at least one additional random value via the at least one satellite communication; wherein generating the cryptographic key is further based on the at least one additional random value.

In Example 23, the subject matter of any one or more of Examples 16-22 optionally include subject matter wherein the key generation parameters specify a key derivation function on the first random value, the second random value, and the third random value.

In Example 24, the subject matter of any one or more of Examples 16-23 optionally include performing a Boolean function on the second random value and a third random value; wherein the transmitting of the second random value and a third random value provides a value based on the Boolean function.

In Example 25, the subject matter of any one or more of Examples 16-24 optionally include subject matter wherein the satellite is a low earth orbit (LEO) satellite, and wherein the terrestrial location comprises a terrestrial station used for communication with the LEO satellite or a compute system associated with the terrestrial station.

In Example 26, the subject matter of any one or more of Examples 16-25 optionally include subject matter wherein the cryptographic key is generated based on the key generation parameters provided from the satellite.

Example 27 is a machine-readable medium (e.g., a non-transitory machine-readable storage medium) including instructions, which when executed by a machine, cause the machine to perform the methods of any of the Examples 15 to 26.

Example 28 is a computing system, comprising: at least one processor; and a memory device comprising instructions, which when executed by the processor, cause the processor to perform of the methods of any of Examples 16 to 26.

Example 29 is a communication device, comprising: networking hardware; and a memory device comprising instructions, which when executed by the networking hardware, cause the networking hardware to perform network operations according to the methods of any of Examples 16 to 26.

Figure 16:
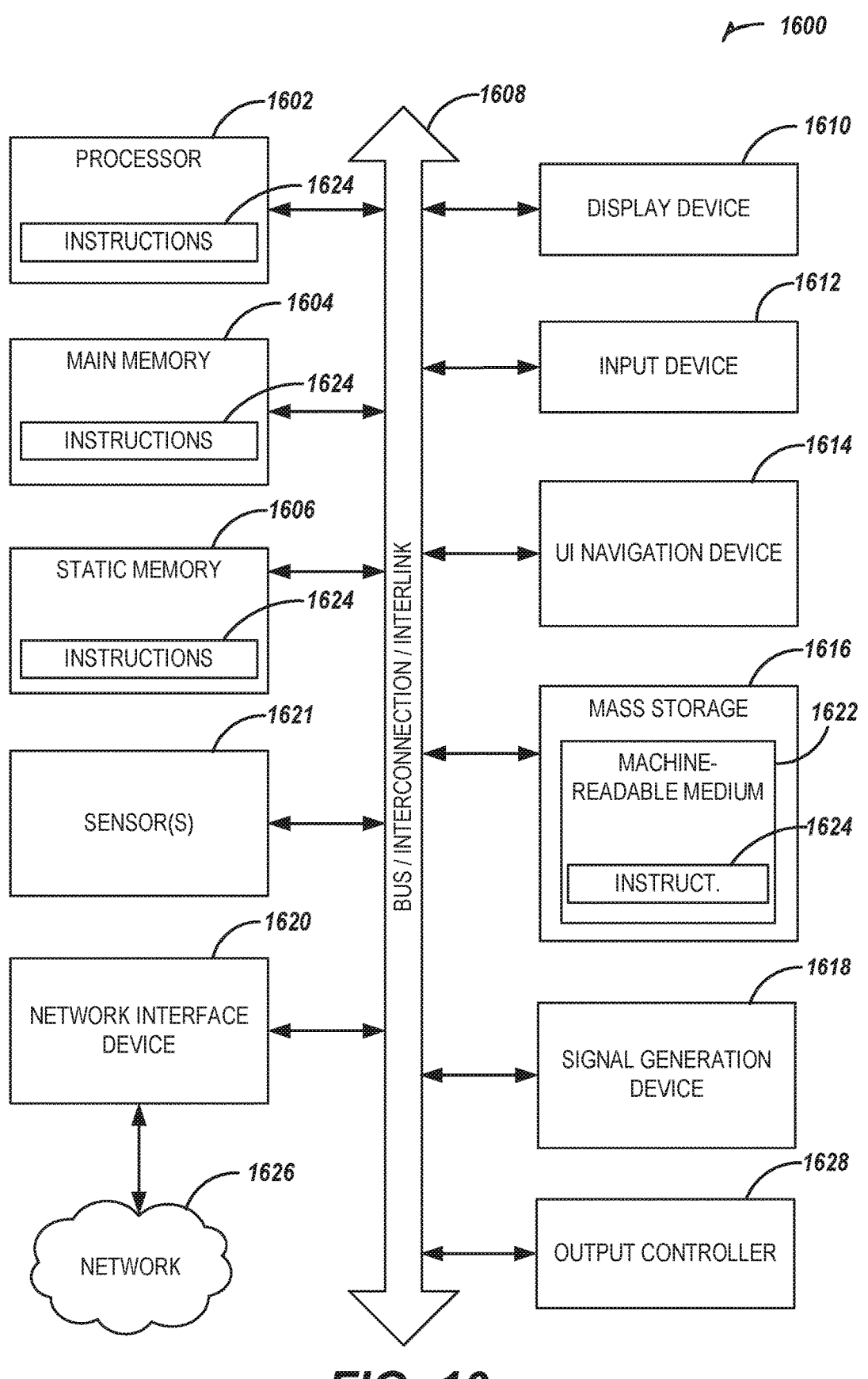
FIG. 16 is a block diagram illustrating an example of a computing machine upon which one or more embodiments may be implemented.

FIG. 16 illustrates a block diagram of an example machine 1600 (e.g., a computing system or computer) upon which any one or more of the techniques (e.g., methodologies) discussed herein may perform. In alternative embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. The machine 1600 may be a personal computer (PC), a tablet PC, a server, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus or interconnect) 1608. The machine 1600 may further include a display unit 1610, an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a storage device (e.g., drive unit) 1616, a signal generation device 1618 (e.g., a speaker), a network interface device 1620, and one or more sensors 1621, such as a global positioning system (GPS) sensor, compass, accelerometer, or other sensors. The machine 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1616 may include a machine readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within static memory 1606, or within the hardware processor 1602 during execution thereof by the machine 1600. In an example, one or any combination of the hardware processor 1602, the main memory 1604, the static memory 1606, or the storage device 1616 may constitute machine readable media.

While the machine readable medium 1622 is illustrated as a single medium, the term "machine readable medium" may include a single medium or multiple media (e.g., a centralized or distributed database, and/or associated caches and servers) configured to store the one or more instructions 1624.

The term "machine readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1600, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method performed by a computing system operating at a terrestrial location for generating a cryptographic key based on satellite-provided entropy values, the method comprising:

receiving a first random value, the first random value locally generated by a first quantum random number generator at the terrestrial location;

receiving a second random value communicated by satellite via at least one satellite communication, the second random value remotely generated by a second quantum random number generator located at a first satellite;

receiving a third random value communicated by satellite via the at least one satellite communication, the third random value remotely generated by a third quantum random number generator located at a second terrestrial location, wherein the third random value is communicated from the second terrestrial location to the computing system at the terrestrial location via a satellite communication network, wherein the third quantum random number generator and the second quantum random number generator operate at different locations and the third random value is different from the second random value;

generating a cryptographic key based on the first random value that is locally generated, the second random value that is communicated by satellite, and the third random value that is communicated by satellite; and establishing an encrypted communication session between the terrestrial location and the second terrestrial location based on use of the cryptographic key, wherein the cryptographic key is a symmetric key that is derived at the terrestrial location and the second terrestrial location based on the first random value, the second random value, and the third random value.

2. The method of claim 1, further comprising:

receiving at least one additional random value via the at least one satellite communication;

wherein generating the cryptographic key is further based on the at least one additional random value.

3. The method of claim 1, wherein generating the cryptographic key includes:

performing a key derivation function based on the first random value, the second random value, and the third random value.

4. The method of claim 3, wherein the key derivation function is performed on a result of a Boolean function that provides a combination of the first random value, the second random value, and the third random value.

5. The method of claim 1, wherein the encrypted communication session provides data associated with at least one financial transaction.

6. The method of claim 1, wherein the at least one satellite communication is conducted with at least one low earth orbit (LEO) satellite, and wherein the terrestrial location comprises a ground station used for communication with the at least one LEO satellite or a computer system associated with the ground station.

7. The method of claim 6, wherein generating the cryptographic key is based on key generation parameters provided from the at least one LEO satellite, and wherein the key generation parameters are determined by the at least one LEO satellite or another terrestrial location.

8. A non-transitory machine-readable medium comprising instructions, which when executed by a machine operating at a terrestrial location, cause the machine to:

identify a first random value, the first random value locally generated by a first quantum random number generator at the terrestrial location;

identify a second random value received by satellite via at least one satellite communication, the second random value remotely generated by a second quantum random number generator located at a first satellite;

receiving a third random value by satellite via the at least one satellite communication, the third random value remotely generated by a third quantum random number generator located at a second terrestrial location, wherein the third random value is communicated from the second terrestrial location to the machine at the terrestrial location via a satellite communication network, wherein the third quantum random number generator and the second quantum random number generator operate at different locations and the third random value is different from the second random value;

generate a cryptographic key based on the first random value that is locally generated, the second random value that is communicated by satellite, and the third random value that is communicated by satellite; and establish an encrypted communication session between the terrestrial location and the second terrestrial location based on use of the cryptographic key, wherein the cryptographic key is a symmetric key that is derived at the terrestrial location and the second terrestrial location based on the first random value, the second random value, and the third random value.

9. The machine-readable medium of claim 8, wherein the instructions, which when executed by the machine, cause the machine to:

identify at least one additional random value received via the at least one satellite communication;

wherein to generate the cryptographic key is further based on the at least one additional random value.

10. The machine-readable medium of claim 8, wherein to generate the cryptographic key includes to:

perform a key derivation function based on the first random value, the second random value, and the third random value.

11. The machine-readable medium of claim 10, wherein the key derivation function is performed on a result of a Boolean function that provides a combination of the first random value, the second random value, and the third random value.

12. The machine-readable medium of claim 8, wherein the encrypted communication session provides data associated with at least one financial transaction.

13. The machine-readable medium of claim 8, wherein the at least one satellite communication is conducted with at least one low earth orbit (LEO) satellite, and wherein the terrestrial location comprises a ground station used for communication with the at least one LEO satellite or a computer system associated with the ground station.

14. The machine-readable medium of claim 13, wherein to generate the cryptographic key is based on key generation parameters provided from the at least one LEO satellite, and wherein the key generation parameters are determined by the at least one LEO satellite or another terrestrial location.

* * * * *